(12) United States Patent
Pinheiro et al.

(10) Patent No.: US 9,686,677 B2
(45) Date of Patent: Jun. 20, 2017

(54) TECHNIQUES FOR DEPLOYING SMALL CELLS AS SECONDARY CELLS FOR USER EQUIPMENT

(71) Applicant: INTEL IP CORPORATION, Santa Clara, CA (US)

(72) Inventors: Ana Lucia A Pinheiro, Hillsboro, OR (US); Andreas Schmidt, Braunschweig (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/652,478

(22) PCT Filed: Nov. 26, 2013

(86) PCT No.: PCT/US2013/071934
§ 371 (c)(1),
(2) Date: Jun. 16, 2015

(87) PCT Pub. No.: WO2014/113141
PCT Pub. Date: Jul. 24, 2014

(65) Prior Publication Data
US 2015/0341838 A1    Nov. 26, 2015

Related U.S. Application Data

(60) Provisional application No. 61/753,914, filed on Jan. 17, 2013.

(51) Int. Cl.
*H04W 12/04* (2009.01)
*H04L 5/00* (2006.01)
(Continued)

(52) U.S. Cl.
CPC .......... *H04W 12/04* (2013.01); *H04B 7/0417* (2013.01); *H04B 7/0456* (2013.01);
(Continued)

(58) Field of Classification Search
CPC ..... H04W 24/10; H04W 64/00; H04W 24/02; H04W 48/12; H04W 4/02; H04W 84/045;
(Continued)

(56) References Cited

U.S. PATENT DOCUMENTS

2010/0113027 A1*  5/2010  Hsu ................... H04W 36/0005
                                                                              455/436
2010/0309849 A1   12/2010  Park et al.
(Continued)

OTHER PUBLICATIONS

International Search Report and Written Opinion received for PCT Patent Application No. PCT/US2013/071934, mailed Mar. 20, 2014, 8 pages.
(Continued)

*Primary Examiner* — Nizar Sivji

(57) ABSTRACT

Examples are disclosed for deploying small cells as secondary cells for user equipment (UE). The examples include an UE, one or more small cell evolved node B (eNBs) or a macro cell eNB gathering information and reporting the gathered information to a management entity for an evolved packet core. The gathered information may be associated with the one or more small cell eNBs serving as a secondary cell for the UE while the macro cell eNB may serve as a primary cell. In some examples, the gathered information may be reported in one or more minimization of drive tests (MDT) reports. The MDT reports may be sent to the management entity by the UE, small cell eNBs or macro cell eNBs for the management entity to manage deployment of the one or more small cell eNBs. Other examples are described and claimed.

19 Claims, 19 Drawing Sheets

(51) Int. Cl.
| | |
|---|---|
| H04B 7/0417 | (2017.01) |
| H04B 7/0456 | (2017.01) |
| H04W 72/02 | (2009.01) |
| H04L 29/06 | (2006.01) |
| H04L 29/08 | (2006.01) |
| H04W 36/22 | (2009.01) |
| H04W 76/04 | (2009.01) |
| H04W 16/32 | (2009.01) |
| H04W 48/16 | (2009.01) |
| H04W 72/04 | (2009.01) |
| H04W 56/00 | (2009.01) |
| H04L 5/22 | (2006.01) |
| H04J 3/00 | (2006.01) |
| H04W 74/00 | (2009.01) |
| H04W 72/12 | (2009.01) |
| H04W 72/00 | (2009.01) |
| H04W 28/02 | (2009.01) |
| H04W 52/02 | (2009.01) |
| H04W 76/02 | (2009.01) |
| H04W 48/20 | (2009.01) |
| H04W 24/02 | (2009.01) |
| H04W 24/10 | (2009.01) |
| H04L 1/18 | (2006.01) |
| H04L 5/14 | (2006.01) |
| H04L 9/14 | (2006.01) |
| H04W 8/00 | (2009.01) |
| H04W 68/02 | (2009.01) |
| H04W 4/06 | (2009.01) |
| H04W 48/08 | (2009.01) |
| H04W 88/06 | (2009.01) |
| H04W 36/00 | (2009.01) |
| H04L 12/26 | (2006.01) |
| H04W 48/10 | (2009.01) |
| H04W 84/12 | (2009.01) |

(52) U.S. Cl.
CPC .............. *H04J 3/00* (2013.01); *H04L 1/1812* (2013.01); *H04L 1/1887* (2013.01); *H04L 5/0051* (2013.01); *H04L 5/0055* (2013.01); *H04L 5/0057* (2013.01); *H04L 5/0062* (2013.01); *H04L 5/0096* (2013.01); *H04L 5/14* (2013.01); *H04L 5/1469* (2013.01); *H04L 5/22* (2013.01); *H04L 9/14* (2013.01); *H04L 43/08* (2013.01); *H04L 63/0428* (2013.01); *H04L 63/30* (2013.01); *H04L 65/1006* (2013.01); *H04L 65/4076* (2013.01); *H04L 65/602* (2013.01); *H04L 65/608* (2013.01); *H04L 65/80* (2013.01); *H04L 67/02* (2013.01); *H04W 4/06* (2013.01); *H04W 8/005* (2013.01); *H04W 16/32* (2013.01); *H04W 24/02* (2013.01); *H04W 24/10* (2013.01); *H04W 28/0231* (2013.01); *H04W 36/0066* (2013.01); *H04W 36/22* (2013.01); *H04W 48/08* (2013.01); *H04W 48/10* (2013.01); *H04W 48/16* (2013.01); *H04W 48/20* (2013.01); *H04W 52/0251* (2013.01); *H04W 56/001* (2013.01); *H04W 68/02* (2013.01); *H04W 72/00* (2013.01); *H04W 72/02* (2013.01); *H04W 72/042* (2013.01); *H04W 72/046* (2013.01); *H04W 72/0406* (2013.01); *H04W 72/0413* (2013.01); *H04W 72/12* (2013.01); *H04W 72/1205* (2013.01); *H04W 72/1263* (2013.01); *H04W 72/1278* (2013.01); *H04W 74/00* (2013.01); *H04W 76/021* (2013.01); *H04W 76/023* (2013.01); *H04W 76/046* (2013.01); *H04W 76/048* (2013.01); *H04W 88/06* (2013.01); *H04L 5/0092* (2013.01); *H04L 5/0094* (2013.01); *H04L 2209/24* (2013.01); *H04L 2209/80* (2013.01); *H04W 84/12* (2013.01)

(58) Field of Classification Search
CPC ..... H04W 36/30; H04W 16/14; H04W 36/32; H04W 72/1263; H04W 36/0088; H04W 36/0094; H04W 36/04; H04W 52/146; H04W 52/244; H04W 16/24; H04W 16/32; H04W 36/0083; H04W 4/025; H04W 52/0229; H04W 64/003; H04W 88/08; H04W 92/20; H04J 11/005; H04J 11/0023; H04J 11/0086; H04L 1/0026; H04L 5/0048; H04B 17/318; H04B 17/309; H04B 17/327; H04B 17/336; H04B 1/7083

See application file for complete search history.

(56) References Cited

U.S. PATENT DOCUMENTS

| | | |
|---|---|---|
| 2011/0201279 A1 | 8/2011 | Suzuki et al. |
| 2012/0039189 A1* | 2/2012 | Suzuki ............... H04W 24/10 370/252 |
| 2012/0263145 A1 | 10/2012 | Marinier et al. |
| 2012/0315890 A1* | 12/2012 | Suzuki ............... H04W 24/10 455/422.1 |
| 2013/0121204 A1 | 5/2013 | Lee et al. |
| 2016/0295360 A1* | 10/2016 | Jones ...................... G01S 5/02 |

OTHER PUBLICATIONS

"Detection of small cells in HetNets", 3GPP TSG-RAN WG2 meeting #77, Ericsson, R2-120467, Feb. 6-10, 2012, 3 pages, author unknown.

"Enhancements for Small Cell Detection", 3GPP TSG-RAN WG2 Meeting #77, Nokia Siemens Networks, Nokia Corporation, R2-120523, Feb. 6-10, 2012, 12 pages, author unknown.

Extended European Search Report received for European Patent Application No. 13871474.6, mailed Jul. 25, 2016, 11 pages.

* cited by examiner

Message Format 400

--ASN1START

```
SystemInformationBlockType1  ::=      SEQUENCE {
    cellAccessRelatedInfo                 SEQUENCE {
        plmn-IdentityList                     PLMN-IdentityList,
        trackingAreaCode                          TrackingAreaCode,
        cellIdentity                          CellIdentity,
        cellBarred                                ENUMERATED {barred, notBarred},
        intraFreqReselection                  ENUMERATED {allowed, notAllowed},
        csg-Indication                            BOOLEAN,
        csg-Identity                          CSG-Identity   OPTIONAL    --Need OR
        secondaryCell-Indication              BOOLEAN
},
```
. . .

*FIG. 4*

UE MDT Log Format 500

| Small Cell ID | CQI | Qualified Time | Delay Time | RSRP | Recent Connect Time | Total Connect Time | Number of Addition Commands |
|---|---|---|---|---|---|---|---|
| | | | | | Successful Addition(s) | | |
| 510 | 511 | 512 | 513 | 514 | 515 | 516 | 517 |
| Aggregate Time Connected to Secondary Cells | | | | | 518 | | |

| Small Cell ID | CQI | RSRP | Transmission Delay | Bit Error Rate | Packet Loss Rate | Secondary Cell Use? |
|---|---|---|---|---|---|---|
| | | | Detected Small Cell(s) | | | |
| 520 | 521 | 522 | 523 | 524 | 525 | 526 |
| % of Detected Small Cells used as Secondary Cells | | | | | | 527 |

| Small Cell ID | CQI | RSRP | # of Unsuccessful Additions | Location When Unsuccessful |
|---|---|---|---|---|
| | | | Unsuccessful Addition(s) | |
| 530 | 531 | 532 | 533 | 534 |
| Total Addition Commands Received | | | 535 | |
| | | | % of Total Addition Commands Unsuccessful | 536 |

*FIG. 5* eNB MDT Log Format 600

| Small Cell ID | Time Activated | Time Deactivated | % of Time Activated | % of Time Deactivated | Traffic Load | % of Time Serving as Secondary Cell |
|---|---|---|---|---|---|---|
| 610 | 620 | 630 | 640 | 650 | 660 | 670 |

*FIG. 6*

Failed Connection MDT Log Format 700

Request(s) from UE(s)

| Small Cell ID | UE ID | # of UE Requests w/o Connection | % of Total Requests from UE w/o Connection | Aggregate # of all UE Requests | % of Aggregate # |
|---|---|---|---|---|---|
| 710 | 711 | 712 | 713 | 714 | 715 |

Request(s) from other Infrastructure Node(s)

| Small Cell ID | UE ID | Requestor ID | # of Requests w/o Connection | % of Total Requests w/o Connection | Aggregate # of all Requests | % of Aggregate # |
|---|---|---|---|---|---|---|
| 720 | 721 | 722 | 723 | 724 | 725 | 726 |

GATHER, AT AN eNB, INFORMATION ASSOCIATED WITH ONE OR MORE SMALL CELL eNBS CAPABLE OF SEPARATELY SERVING AS A SECONDARY CELL FOR AN UE THAT ALSO HAS A MACRO CELL eNB SERVING AS A PRIMARY CELL
*1302*

SEND GATHERED INFORMATION IN AN MDT REPORT TO A MANAGEMENT ENTITY FOR AN EPC
*1304*

*FIG. 13*

Storage Medium 1700

Computer Executable
Instructions for 1600

*FIG. 17*

TECHNIQUES FOR DEPLOYING SMALL CELLS AS SECONDARY CELLS FOR USER EQUIPMENT

RELATED CASE

This application claims priority to U.S. Provisional Patent Application No. 61/753,914, filed on Jan. 17, 2013, that is hereby incorporated by reference in its entirety.

TECHNICAL FIELD

Examples described herein are generally related to wireless communication devices.

BACKGROUND

Small cells which may include, but are not limited to, picocells or femtocells may be deployed to serve user equipment (UEs) located within one or more larger macro cells in a wireless network. These small cells may be offered or provided by low power base stations deployed to cope with locations within the one or more macro cells that may have higher concentrations of UEs such as an office complex, collage campus, an urban core or a sports arena. Small cells may also be deployed to possibly boost data throughputs in locations that may experience weaker signals from a given macro cell base station due to distance and/or interference. A low power base station is typically configured to have a transmit power that is lower than a transmit power for the given macro cell base station.

BRIEF DESCRIPTION OF THE DRAWINGS

FIG. 4 illustrates an example of a message format.
FIG. 5 illustrates an example UE minimization of drive tests (MDT) log format.
FIG. 6 illustrates an example evolved Node B (eNB) MDT log format.
FIG. 7 illustrates an example failed connection MDT log format.
FIG. 13 illustrates an example of a second logic flow.
FIG. 17 illustrates an example of a third storage medium.

DETAILED DESCRIPTION

Figure 1:
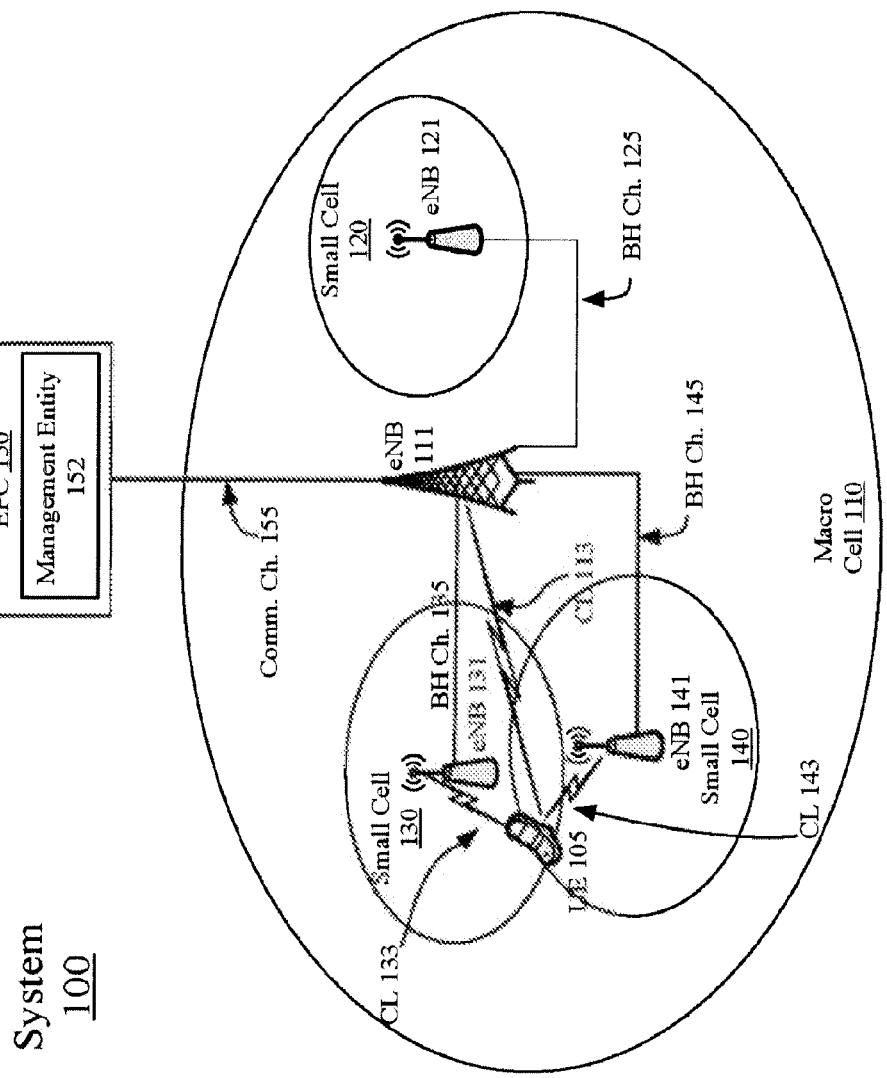
FIG. 1 illustrates an example of a first system.

Examples are generally directed to improvements for wireless wide area networks (WWANs) using wireless mobile telecommunication cellular or wireless mobile broadband technologies. Wireless mobile broadband technologies may include any wireless technologies suitable for use with wireless devices or user equipment (UE), such as one or more third generation (3G), fourth generation (4G) or emerging fifth generation (5G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10 or 11 of LTE/System Architecture Evolution (SAE), and so forth. The examples are not limited in this context.

By way of example and not limitation, various examples may be described with specific reference to various 3GPP radio access network (RAN) standards, such as the 3GPP Universal Terrestrial Radio Access Network (UTRAN), the 3GPP Evolved Universal Terrestrial Radio Access Network (E-UTRAN) and 3GPP's suite of UMTS and LTE/LTE-Advanced Technical Specifications (in case of LTE/LTE-Advanced collectively "3GPP LTE Specifications" according to the 36 Series of Technical Specifications), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 January 2012 titled "Draft Amendment to IEEE Standard for Wireless-MAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

As contemplated in the present disclosure, small cells may be deployed under macro cell coverage to provide an additional way or layer to serve UEs located within a macro cells. In other words, a small cell encompasses a smaller area compared to an area covered by a macro cell. Small cells may also be deployed at macro cell edges or, generally speaking, areas where macro cell coverage can be expected to be poor and/or in coverage holes of the macro cell. The macro cell may be provided by a base station arranged to operate as an evolved Node B (eNB) according to one or more 3GPP LTE Specifications including LTE-A (hereinafter referred to as a "macro cell eNB"). Also, smalls cells may be provided by another, relatively low power base station also arranged to operate as an eNB according to one or more 3GPP LTE Specifications including LTE-A (hereinafter referred to as a "small cell eNB"). In some examples, a UE may be wirelessly connected to both a macro cell eNB and a small cell eNB concurrently. This concurrent connection may be called a dual connection or dual connectivity. Dual connectivity may be similar to inter-eNB carrier aggregation (CA). The examples, however, are not limited in this respect.

In some examples, a network operator for a wireless network may have a mobility management entity (MME) for an evolved packet core (EPC) that may be arranged to operate according to one or more 3GPP LTE Specifications including LTE-A. The network operator may monitor and/or optimize the wireless network via use of minimization of drive tests (MDT) reports sent by UEs and/or eNBs in the wireless network. The MDT reports may be based on measurements or information gathered by the UEs and/or eNBs and reported back to the EPC. For example, MDT reports may be conveyed to one of the following management entities residing in the evolved packet core of the wireless communication system: a TCE (Trace Collection Entity), an MDT server, an O&M (Operation and Maintenance) entity, an MME, or any other suitable management entity.

Typically, MDT reports have been used in scenarios where a UE may be connected only to a single eNB at any given time. However, the advent of dual connectivity implies that new MDT related measurements and information may be needed by a network operator in order to monitor or optimize various infrastructure elements of a wireless network that supports dual connectivity. It is with respect to these and other challenges that the examples described herein are needed.

In some examples, techniques are implemented for deploying small cells as secondary cells for one or more UEs. The techniques may include detecting at a UE a small cell eNB and determining whether the small cell eNB is suitable for serving as a secondary cell with a macro cell eNB serving as a primary cell for the UE (e.g., used for a dual connection). For these examples, the UE may then report to the macro cell eNB that the small cell eNB is qualified based on the determination. A command may then be received from the macro cell eNB to add the small cell eNB as the secondary cell. Adding the small cell eNB may include maintaining a first connection with the macro cell eNB and maintaining a second connection with the small cell eNB. The UE may then gather measurements associated with detecting the small cell eNB, adding the small cell eNB as the secondary cell or maintaining the first connection. The gathered measurements may then be sent in an MDT report to a management entity for an EPC (e.g., a TCE, an MDT server, an O&M entity or an MME).

According to some examples, the techniques may also include an eNB (e.g., small or macro cell eNB) gathering information associated with one or more small cell eNBs capable of separately serving as a secondary cell for an UE that also has a macro cell eNB serving as a primary cell. For these examples, the eNB may send gathered information in an MDT report to the management entity for the EPC.

In some examples, the techniques may also include the management entity for the EPC receiving an MDT report originating from an UE, a macro cell eNB or a small cell eNB. The management entity may then manage small cell eNBs based on the MDT report. For these examples, the small cell eNBs may be separately capable of serving as a secondary cell for the UE while the macro cell eNB serves as a primary cell for the UE. Managing may include causing a first portion of the small cell eNBs to be activated to serve as potential secondary cells for the UE or deactivated from serving as potential secondary cells for the UE.

FIG. 1 illustrates an example of a first system. In some examples, as shown in FIG. 1, the first system includes system 100. System 100 may be part of a wireless network operated according to one or more 3GPP Specifications including LTE-A. As shown in FIG. 1, system 100 includes macro cell 110 and small cells 120, 130 and 140. Also, as shown in FIG. 1, macro cell 110 and small cells 120, 130 and 140 may each include eNBs 111, 121, 131 and 141, respectively. According to some examples, small cells 120, 130 or 140 may represent micro, pico or femto cells deployed under macro cell 110 coverage. As described more below UEs such as UE 105 may be capable of maintaining two separate connections between macro cell eNB 111 and one of eNBs 121, 131 or 141. Also, as described below, UE 105 or eNBs 111, 121, 131 and 141 may gather information or measurements and send MDT reports to various elements of the EPC 150 based on the gathered information or measurements.

In some examples, for the reception of MDT reports, EPC 150 may include management entity 152. For these examples, management entity 152 may include one or more management entities, such as a TCE, an MDT server, an O&M entity, an MME, or any other suitable management entity for receiving MDT reports and managing at least some aspects of a wireless network that may include system 100.

According to some examples, as shown in FIG. 1, eNB 111 may be coupled or interconnected with eNBs 121, 131 and 141 via separate backhaul (BH) channels. These BH channels are shown in FIG. 1 as a BH channel 125, a BH channel 135 and a BH channel 145 coupled between eNB 111 and eNBs 121, 131, and 141, respectively. For these examples, eNBs 111, 121, 131 and 141 may communicate through these backhaul channels via an X2 interface.

Also as shown in FIG. 1, in some examples, eNB 111 may couple to EPC 150 through communication channel 155. For these examples, eNBs 121, 131 or 141 may route communications to an MME or serving gateway (SGW) (not shown) located at or with EPC 150 through eNB 111 via use of the backhaul communication channels. In other examples, eNBs 121, 131 or 141 may separately couple to the MME or SGW through separate communication channels.

According to some examples, as shown in FIG. 1, UE 105 may be located at or near the edge of cells 130 and 140. Also, as shown in FIG. 1, UE 105 may be communicatively coupled to and/or may be able to measure communication signals from eNBs 111, 131 and 141 via a communication link (CL) 113, a CL 133 and a CL 143, respectively. For these examples, UE 105 may include logic and/or features to determine whether eNB 131 and/or eNB 141 are suited or qualified to serve as a secondary cell with eNB 111 serving as a primary cell for UE 105. UE 105 may report whether eNB 131 and/or eNB 141 is/are suited. Responsive to a command from eNB 111, UE 105 may then add either eNB 131 or eNB 141 as the secondary cell. Logic and/or features at UE 105 may then gather measurements associated with detecting eNB 131 or eNB 141, adding the qualified eNB or maintaining a connection with the qualified eNB. The logic and/or features at UE 105 may then send gathered measurements in an MDT report to management entity 152 for EPC 150.

UE 105 is not restricted to always establishing and maintaining only two connections. Instead, the term "dual connectivity" may also describe a scenario with UE 105 capable of maintaining a first connection to the macro cell eNB 111 (offering the primary cell 110) and multiple second connections to various small cell eNBs, such as small cell eNBs 131 and 141 (offering secondary cells 130 and 140). Consequently, there may be more than just one second connection.

According to some examples, UE 105 may be any electronic device having wireless capabilities or equipment. For some examples, UE 105 may be implemented in a fixed or mobile device. A fixed device generally refers to an electronic device designed to be in a fixed, stationary, permanent or otherwise non-moving position or location that does not vary over time. For instance, a fixed device may be installed with fixtures, attachments and housings to prohibit movement, including wired power lines, transmission lines, and so forth. By way of contrast, a mobile device is designed to be portable enough to be frequently moved between various locations over time. It may be appreciated that although a fixed device is generally stationary, some fixed devices may be disconnected from their current equipment in a first fixed location, moved to a second fixed location, and connected to equipment at the second fixed location.

Figure 2:
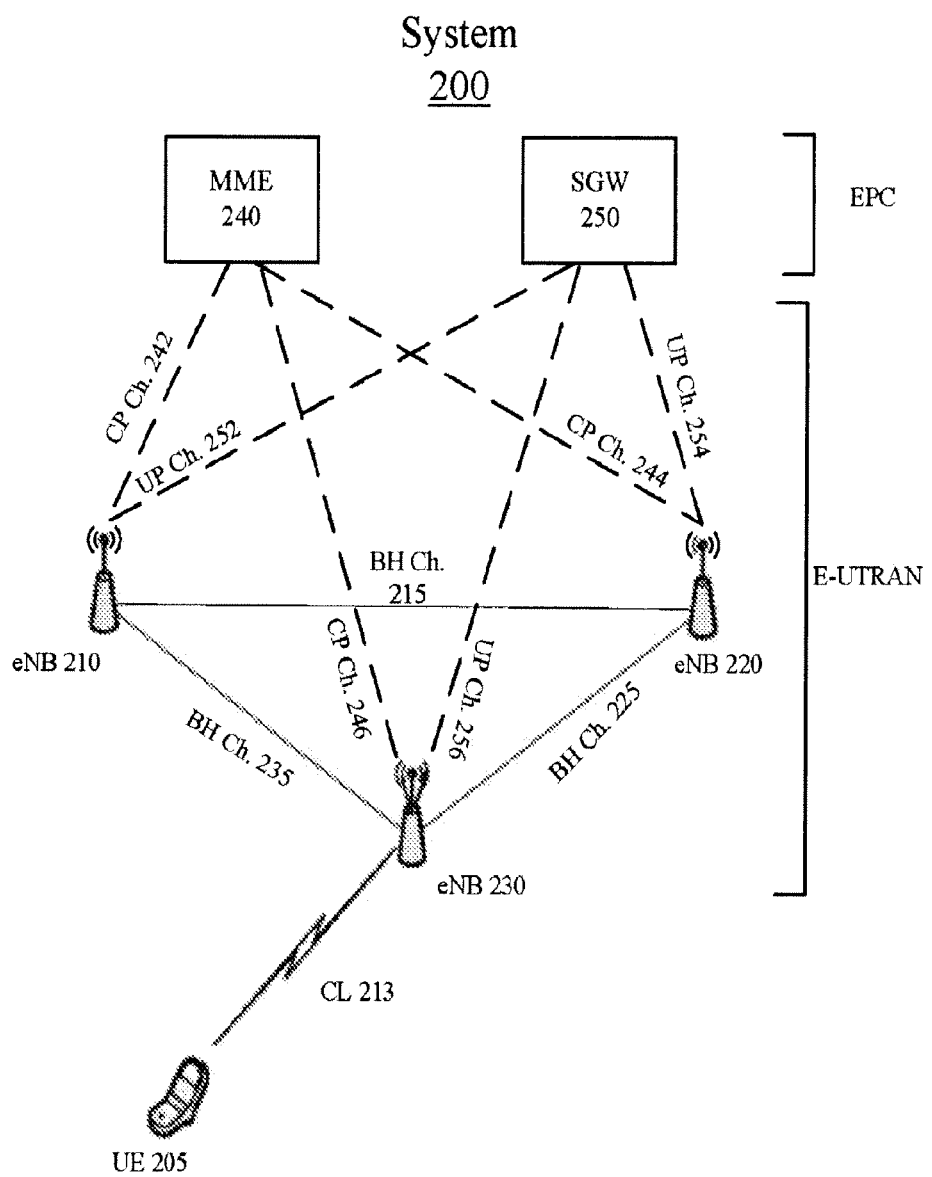
FIG. 2 illustrates an example of a second system.

FIG. 2 illustrates an example of a second system. In some examples, as shown in FIG. 2, the second system includes system 200. System 200 may be similar to system 100 and may be part of a wireless network operated according to one or more 3GPP Specifications including LTE-A. As shown in FIG. 2, system 200 includes an UE 205, eNBs 210, 220, 230, an MME 240 or an SGW 250. According to some examples, as shown in FIG. 2, MME 240 and SGW 250 may be part of an EPC for the LTE-compliant wireless network and eNBs 210, 220 and 230 may be part of an evolved universal terrestrial radio access network (E-UTRAN) for the LTE-compliant wireless network.

According to some examples, as shown in FIG. 2, eNBs 210, 220 and 230 may be coupled or interconnected via BH channels 215, 225 and 235. For these examples, eNBs 210, 220 and 230 may include logic and/or features capable of communicating through BH channels 215, 225 or 235 via an X2 interface. In some examples, BH channels 215, 225 or 235 may include wired and/or wireless communication mediums configured to enable eNBs 210, 220 and 230 to communicate via the X2 interface.

In some examples, as shown in FIG. 2, eNBs 210, 220 and 230 may be coupled with MME 240 through control plane (CP) channels 242, 244 and 246, respectively. For these examples, eNBs 210, 220 and 230 may each include logic and/or features capable of communicating through CP channels 242, 244 or 246 via an S1-MME interface. In some examples, CP channels 242, 244 or 246 may include wired and/or wireless communication mediums configured to enable eNBs 210, 220 or 230 to communicate with MME 240 via the respective S1-MME interfaces. Information communicated may originate from the MME and include information to manage or control operating parameters for eNBs 210, 220, 230 or UE 205 based on MDT reports. In this context, managing or controlling operating parameters for eNBs may comprise taking energy saving schemes or power consumption policies or individual subscriber profiles into account.

According to some examples, as shown in FIG. 2 eNBs 210, 220 and 230 may be coupled with SGW 240 through user plane (UP) channels 252, 254 and 256, respectively. For these examples, eNBs 210, 220 and 230 may each include logic and/or features capable of communicating through UP channels 252, 254 or 256 via an S1-U interface. In some examples, UP channels 252, 254 or 256 may include wired and/or wireless communication mediums configured to enable eNBs 210, 220 or 230 to communicate with SWG 250 via respective S1-U interfaces. For these examples, data traffic originating from UEs may be routed over one or more communication links established with a given eNB. Data traffic originating from that UE may then be routed through a given user plane channel between the given eNB and SGW 250 via that given eNB's S1-U interface. For example, as shown in FIG. 2, UE 205 may have established CL 213 with eNB 230. Data traffic originating from UE 205 may be routed over CL 213 and then routed through UP channel 256 to SWG 250 via eNB 230's S1-U interface.

In some examples, UE 205 may include logic and/or features to communicate with one or more eNBs via an LTE air interface or LTE Uu interface. For example, UE 205 may communicate through CL 213 with eNB 230 via an LTE Uu interface. Although not shown in FIG. 2, in some examples, eNB 230 may be a macro cell eNB and eNB 210 and/or eNB 220 may be small cell eNBs capable of providing secondary cells for UE 205.

According to some examples, UE 205 may be commanded by a macro cell eNB such as eNB 230 to add either eNB 210 or eNB 220 as a secondary cell. Addition of either of these eNBs as the secondary cell may include establishing a second connection or communication link. UE 205 may then communicate through the second connection or communication link to the added eNB via its LTE Uu interface. In other words, UE 205 may then use a first communication link CL 213 with eNB 230 and simultaneously a second communication link (not shown in FIG. 2) with eNB 210 and/or eNB 220 for communication. Also, UE 205 may gather measurements associated with detecting eNBs (i.e. determining possible candidates for potential addition), adding the qualified eNB or maintaining the second connection with the added eNB. Types of measurements or information gathered are described more below. Logic and/or features at UE 205 may be capable of sending gathered measurements in an MDT report to the EPC. The MDT report, for example, may be first routed to eNB 230 through CL 213 and then to EPC.

Figure 3A:
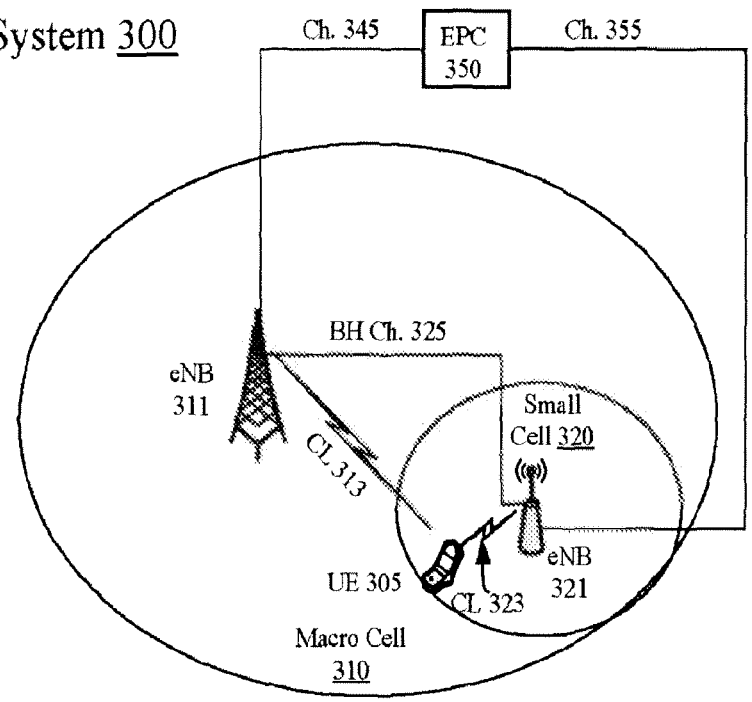
FIG. 3 illustrates an example of a third system.
Figure 3B:
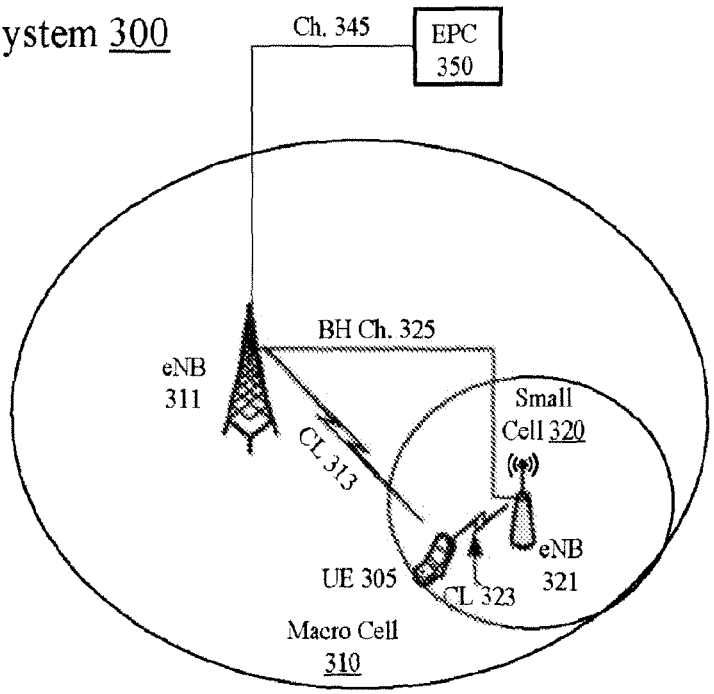

FIGS. 3A-B illustrate an example of a third system. In some examples, as shown in FIGS. 3A-B, the second system includes system 300. System 300 may be part of wireless network operated according to one or more 3GPP Specifications including LTE-A. As shown in FIG. 3A, system 300 includes an UE 305 located within macro cell 310 and small cell 320. For these examples, UE 305 may be wirelessly connected to eNB 311 through CL 313 and to eNB 321 through CL 323. Also, as shown in FIG. 3A, BH channel 325 may be coupled between eNBs 311 and 321. FIG. 3A also shows that eNB 311 and eNB 321 may be coupled to EPC 350 through channels 345 and 355, respectively.

According to some examples, as described more below, logic and/or features at EPC 350 (e.g., management entities) may be capable of receiving one or more MDT reports originating from UE 305, eNB 311 or eNB 321. The logic and/or features at EPC 350 may then manage one or more small cell eNBs such as eNB 321 based on received MDT reports. For some examples, a MDT report originating from UE 305 may be routed through CL 313 to eNB 311 and then to EPC 350 through channel 345. For other examples, the MDT report originating from UE 305 may be routed through CL 323 to eNB 321 and then to EPC 350 through channel 355. MDT reports originating from either eNB 311 or eNB 321 may be routed directly to EPC 350 via respective channels 345 and 355.

In some examples, BH channel 325 between eNBs 311 and 321 may be used to coordinate a dual connection with UE 305. For example, eNB 311 may have commanded UE 305 to add eNB 321 as a secondary cell over a connection through CL 323 while maintaining another connection through CL 313 with eNB 311 serving as a primary cell. Coordinating the dual connection may include load balancing services supported for UE 305 and/or assigning default or dedicated bearers to provide the services to UE 305 (e.g., Internet services, e-mail services, voice services, streaming video/audio services, etc.). Load balancing of the services using the dual connection may enable UE 305 to simultaneously receive multiple services and thus boost UE 305's capacity to consume those services.

According to some examples, as shown in FIG. 3B, eNB 321 may not have a direct connection with EPC 350. For these examples, in addition to coordinating the dual connection with UE 305, BH Ch. 325 may be utilized by eNB 321 to forward MDT reports. These forwarded MDT reports may have originated from eNB 321 or may have originated from UE 305. Logic and/or features at eNB 311 may be capable of receiving the MDT reports from eNB 321 and/or UE 305 and then forwarding the received MDT reports to EPC 350 through channel 345. Also, command or control information from EPC 350 may be routed through channel 345 to eNB 311 and then to eNB 321 through BH channel 325.

FIG. 4 illustrates an example message format 400. According to some examples, message format 400 may be similar to a portion of a SystemInformationBlockType1 message that may be broadcasted or transmitted from eNBs in an LTE-compliant wireless network (e.g., eNBs 311 or 321). For these examples, the boxed portion of message format 400 is shown in FIG. 4 as including "secondaryCell-Indication BOOLEAN".

In some examples, an UE that receives a message in the example format of message format 400 may use this portion to decide whether the sending eNB is qualified as a secondary cell. For example, the UE may include logic and/or features to determine whether the BOOLEAN is set to TRUE. If set to TRUE this may indicate to the UE that the sending eNB is qualified. Also, TRUE may indicate that the UE may not be allowed to access the sending eNB to serve as a secondary cell unless a specific command is received from the wireless network (e.g., from a macro cell eNB or MME). If set to FALSE, this may indicate to the UE that the eNB is not qualified to serve as a secondary cell.

In some examples, the UE may receive a message from a given small cell eNB that is in the format of example format 400. For these examples the message may set to TRUE the secondaryCell-Indication. For these examples, the UE may report to the macro cell eNB that a small cell eNB has been detected that is potentially suited to serve as a secondary cell based at least in part on the TRUE setting for secondaryCell-Indication. For these examples, the UE may perform measurements on the small cell that is deemed potentially suited to serve as a secondary cell based at least in part on the TRUE setting for secondaryCell-Indication. For these examples, the UE may decide whether a detected small cell is qualified or suited to serve as a secondary cell based at least in parts on the measurements performed and/or on the TRUE setting for secondaryCell-Indication. Also for these examples, the UE may report to the macro cell eNB that an eNB has been determined to be qualified or suited based at least in part on the TRUE setting for secondaryCell-Indication. The UE may then wait for a command from the macro cell eNB to possibly add the given small cell eNB as a secondary cell.

FIG. 5 illustrates an example UE MDT log format 500. According to some examples, logic and/or features at a UE may maintain an MDT log in the example format of UE MDT log format 500. For these examples, the generated MDT log may be based on gathered measurements or information derived from those gathered measurements associated with detecting one or more small cell eNBs, detecting one or more small cell eNBs as being potentially suitable to serve as a secondary cell, determining whether one or more of the detected small cells do actually qualify for being used as a secondary cell, adding the one or more small cell eNBs as a secondary cell for at least a period of time or maintaining dual connections with the one or more small cell eNBs and a macro cell eNB that may be managed or controlled by a management entity at the EPC.

In some examples, the MDT log in the example format of UE MDT log format 500 may be stored in a memory at the UE that may have a limited capacity to store the gathered measurements or information. According to some examples, logic and/or features at the UE may be capable of monitoring the capacity allocated to store the MDT log and may cause the UE to generate and send an UE MDT report to the management entity at the EPC (e.g., routed through the macro cell eNB) if the allocated capacity has been reached (for instance, in accordance with a new operational mode of MDT). In other examples, logic and/or features at the UE may be capable of indicating to the macro cell eNB availability of an MDT log if the allocated capacity has been reached, so that the macro cell eNB may decide to retrieve the MDT log from the UE (for instance, in the context of Logged-MDT operation). In other examples, the logic and/or features may also generate and send an UE MDT report to the macro cell eNB responsive to an elapse of a report time interval (e.g., periodically, for instance in the order of magnitude of a few milliseconds) or responsive to an occurrence of an event (for instance, in the context of Immediate-MDT operation).

According to some examples, an UE MDT log in example UE MDT log format 500 may include various fields associated with the UE detecting potentially suited small cells, determining small cells are qualified or suited to serve as secondary cells, adding small cells as secondary cells and maintaining connections with added small cells. For example, successful addition(s) is shown in FIG. 5 as including fields 510-518. These fields may be associated with times when the UE detected one or more small cell eNBs and was able to successfully add the detected one or more small cell eNBs as one or more secondary cell following receipt of a command from a macro cell eNB serving as the primary cell for the UE. Field 510 may include a small cell identification (ID) to identify each small cell eNB successfully added. Field 511 may include channel quality indication (CQI) information received from each small cell eNB to facilitate a connection with the UE. Field 512 may include qualified time measurements to indicate an amount of time each small cell eNB has been determined by the UE to be qualified to serve as a secondary cell for the UE. Field 513 may include time measurements to indicate a delay time between when a UE has reported to the macro cell eNB a small cell eNB's qualified status and when the UE receives a command to add the small cell eNB as a secondary cell. Field 514 may include signal strength measurements such as reference signal received power (RSRP) from each added small cell eNB. In addition to or in place of RSRP the following signal strength measurements may also be included: RSRQ (Reference Signal Received Quality) and/or RSSI (Received Signal Strength Indicator). Field 515 may include a recent connect time to indicate a most recent measured connect time for each added small cell eNB. Field 516 may indicate a total measured connect time for each added small cell eNB. Field 517 may indicate a number of addition commands received from the macro cell eNB for each added small cell eNB. Field 518 may include an aggregate measured time the UE has been connected to all added eNBs serving as secondary cells for the UE.

As shown in FIG. 5, an UE MDT log in example UE MDT log format 500 may also include information for detected small cell(s). Fields 520-527 may include measurements and/or information associated with detecting small cell eNBs. These detected small cell eNBs may or may not be deemed potentially suited to serve as secondary cells by the UE, These detected small cell eNBs may or may not have been determined as qualified by the UE. Field 520 may include a small cell ID to identify each small cell eNB detected. Field 521 may include CQI information received from each detected small cell eNB. Field 522 may include one or more RSRP measurements by the UE upon detecting each small cell eNB. In addition to or in place of RSRP the signal strength measurements may also include RSRQ and/or RSSI. Field 523 may include other channel measurements such as transmission delay associated with possible channel(s) to be used for a connection with detected small cell eNB(s). Field 524 may include channel measurements such as a bit error rate for the possible channel(s). Field 525 may include channel measurements such as a packet loss rate for the possible channel(s). Field 526 may include an indication as to whether each detected small cell eNB was added as a secondary cell. Field 527 may include an indication of a percentage of detected small cell eNBs actually used as secondary cells. In another embodiment at least one additional field may be included for a suitability and/or qualification indication (not shown in FIG. 5), i.e. for information pertaining to the outcome of the UE's determination procedure to find out whether a detected small cell is deemed suited or actually qualifies for being added as a secondary cell.

As shown in FIG. 5, example UE MDT log format 500 may also include information for unsuccessful addition(s) in fields 530 to 536. Fields 530 to 536 may include measurements and/or information associated with unsuccessfully added small cell eNBs. Field 530 may include a small cell ID to identify each small cell eNB unsuccessfully added following receipt of a command from the macro cell eNB to add the small cell eNB. Field 531 may include CQI information received from each unsuccessfully added small cell eNB. Field 532 may include RSRP measurements by the UE at a time associated with the unsuccessful addition or an average RSRP measurement if multiple unsuccessful additions have occurred. In addition to or in place of RSRP the following signal strength measurements may also include RSRQ and/or RSSI. Field 533 may indicate a total number of unsuccessful attempts to add a small cell eNB. Field 534 may indicate one or more physical locations (e.g., global positioning system coordinates) of the UE during each unsuccessful addition for each unsuccessfully added small cell eNB. Field 535 may indicate a total number of addition commands received from the macro cell eNB for the UE to add small cell eNBs as secondary cells. Field 536 may indicate a percentage of the total number of addition commands that were received yet resulted in unsuccessful additions.

In some examples, an UE MDT report using some or all of the information maintained in an MDT log in the example format of UE MDT log format 500 may be generated by a UE. Other information may be included in the UE MDT report and examples are not limited to information described above for UE MDT log format 500. Also, additional measurements and/or gathered information may be maintained in an MDT log at the UE and examples are not limited to the fields described above for UE MDT log format 500. Also, a different grouping of measurements and/or gathered information may be used in an MDT log at the UE as well as for the process of reporting. Also, in the example of FIG. 5, the order of measurements and/or gathered information within a cluster was chosen arbitrarily and for other examples that order and/or gathered information may vary.

FIG. 6 illustrates an example eNB MDT log format 600. According to some examples, logic and/or features at an eNB may generate and maintain an MDT log in the example format of eNB MDT log format 600. For these examples, the generated and maintained MDT log may be based on gathered information associated with one or more small cell eNBs capable of separately serving as a secondary cell for an UE while a macro cell eNB serves as a primary cell for the UE. Both these types of serving eNBs may be managed or controlled by a management entity for an EPC. The management entity for the EPC may be a recipient of one or more eNB MDT reports generated by these types of serving eNBs based on information maintained in the MDT log in the example format of eNB MDT log format 600.

In some examples, eNB MDT log format 600 may be used by eNBs capable of serving as either a macro cell eNB or a small cell eNB. For these examples, an eNB capable of serving as a macro cell may use eNB MDT log format 600 to maintain gathered information associated with a plurality of small cell eNBs. A given eNB capable of serving as a small cell may use eNB MDT log format 600 to maintain gathered information associated with just the given small cell eNB.

In some examples, the MDT log in the example format of eNB MDT log format 600 may be stored in a memory at the eNB that may have a limited capacity to store the gathered information. According to some examples, logic and/or features at the eNB may be capable of monitoring the capacity allocated to store the MDT log and may cause the eNB to generate and send an eNB MDT report to the management entity for the EPC if the allocated capacity has been reached. In other examples, the logic and/or features may enable the eNB to aggregate several MDT reports and to generate and send a consolidated eNB MDT report.

In other examples, the logic and/or features may also enable the eNB to generate and send an eNB MDT report responsive to an elapse of a report time interval or responsive to a report command (i.e. a request for retrieval) received from the management entity for the EPC to send an eNB MDT report to the management entity.

According to some examples, an eNB MDT log in example eNB MDT log format 600 may include various fields including information gathered by an eNB to report to the management entity for the EPC. For example, field 610 may include a small cell ID to identify each of the one or more eNBs for which information was gathered. Field 620 may include information to indicate an amount of time each eNB has been activated and field 630 may indicate an amount of time each eNB has been deactivated. For example, the eNB may be selectively activated or deactivated responsive to management actions taken by the management entity based on various MDT reports received by the management entity. Fields 640 and 650 may include information to indicate percentages of total operating time each eNB has been respectively activated and deactivated.

In some examples, field 660 of eNB MDT log format 600 may include information to indicate a traffic load for each eNB. For these examples, the traffic load may be based on logic and/or features at the eNB monitoring traffic transmitted from or through the eNB. The monitored traffic may include signaling and data routed via various interfaces such as X2, S1-MME or S1-U interfaces. This information may be included in an eNB MDT report to the management entity for the EPC to facilitate load balancing between small cell eNBs or may cause a network operator to consider adding or removing eNBs based on high or low traffic loads reported for one or more small cell eNBs. Alternatively, there may be separate fields in the eNB MDT log format 600 enabling the eNB to separately indicate to the management entity traffic load for c-plane signaling and traffic load for u-plane data (not shown in FIG. 6), or to separately indicate to the management entity the traffic load on various interfaces (including, but not limited to, backhaul and fronthaul interfaces) offered by the eNB (also not shown in FIG. 6).

According to some examples, field 670 of eNB MDT log format 600 may include information to indicate a percentage of operating time each eNB was serving as a secondary cell for one or more UEs while activated. This information may also be included in an eNB MDT report to the management entity for the EPC. The management entity may use this information to facilitate load balancing between small cell eNBs. The management entity may use this information also to make reasonable or economically worthwhile small cell eNB activation and deactivation decisions.

In some examples an eNB MDT report using some or all of the information maintained in an MDT log in the example format of eNB MDT log format 600 may be generated by either a macro cell eNB or a small cell eNB. Other information may be included in the eNB MDT report and examples are not limited to information described above for eNB MDT log format 600. Also, additional gathered information may be maintained in an MDT log at the macro cell eNB or small cell eNB and examples are not limited to the fields described above for eNB MDT log format 600. A different grouping of measurements and/or gathered information may be used in an MDT log at the eNB as well as for the process of reporting. Also, in the example of FIG. 6, the order of measurements and/or gathered information was chosen arbitrarily and for other examples that order and/or gathered information may vary.

FIG. 7 illustrates an example failed connection (FC) MDT log format 700. According to some examples, logic and/or features at a macro cell eNB may generate and maintain information in an FC MDT log in the example format of FC MDT log format 700. For these examples, the FC MDT log may be based on gathered information from one or more small cell eNBs capable of separately serving as a secondary cell for one or more UEs while the macro cell eNB serves as a primary cell for the one or more UEs. Information maintained in the FC MDT log may be sent to a management entity for an EPC.

In some examples, the FC MDT log in the example format of FC MDT log format 700 may be stored in a memory at a macro cell eNB that may have a limited capacity to store the gathered information. According to some examples, logic and/or features at the macro cell eNB may be capable of monitoring the capacity allocated to store the FC MDT log and may cause the eNB to generate and send an eNB MDT report to the management entity including information maintained in the FC MDT log if the allocated capacity has been reached. In other examples, the logic and/or features may enable the macro cell eNB to aggregate several MDT reports and to generate and send a consolidated eNB MDT report. The consolidated eNB MDT report may include information in the FC MDT log responsive to an elapse of a report time interval (e.g., 7 days or 24 hours) or responsive to a report command (i.e. a request for retrieval) received from the management entity to send an eNB MDT report.

According to some examples, an FC MDT log in example FC MDT log format 700 may include various fields associated with either requests from one or more UEs or from infrastructure nodes (e.g., small cell eNBs or one or more management entities for the EPC) for adding a small cell eNB to serve as a secondary cell for an UE. For example, request(s) from UE(s) is shown in FIG. 7 as including fields 710 to 715. Field 710 may include a small cell ID to identify each small cell eNB that one or more UEs may have sent a request or report indicating the identified small cell eNB was qualified to serve as a secondary cell for the one or more UEs. Field 711 may include an UE ID for the UE that sent the request or report. Field 712 may include an indication of a number of UE requests for each small cell eNB that were received by the macro cell eNB without a connection. In other words, a UE may have reported a given small cell eNB as qualified for serving as a secondary cell, the macro cell eNB may have sent a command to add the given small cell eNB as a secondary cell yet the UE failed to add the given small cell eNB as a secondary cell. Field 713 may include an indication of a percentage of total requests from the UE that resulted in no connection. Field 714 may include an indication of an aggregate number of all UE requests made to add a given small cell as a secondary cell. Field 715 may include an indication of a percentage of the aggregate number of all UE requests for which a given UE without a connection. Field 715 may include information to indicate to the management entity for the EPC that the given UE may be the probable source or cause of failed connections or additions if the percentage of the aggregate number is relatively high.

As shown in FIG. 7, example FC MDT log may also include information for requests from other infrastructure nodes in fields 720 to 726. Field 720 may include a small cell ID to identify each small cell eNB that an infrastructure node such as an MME may have identified as qualified to serve as a secondary cell for the one or more UEs. Field 721 may include an UE ID for the UE that other infrastructure nodes may have identified as possibly being served by an identified small cell eNB as the secondary cell. Field 722 may include a requestor ID to identify the source of the request to add the identified small cell eNB as the secondary cell. Field 723 may include an indication of a number of requests received without a connection to the identified small cell eNB. Field 724 may include an indication of a percentage of total requests to add the identified small cell eNB as a secondary cell for the identified UE from the identified requestor that resulted without a connection. Field 725 may include an indication of an aggregate number of all requests made to the identified small cell eNB to serve UEs as a secondary cell. Field 726 may include an indication of a percentage of the aggregate number that may be attributed to the identified UE. Similar to field 715 mentioned above, field 726 may include information to indicate to the management entity for the EPC that the given UE may be the probable source or cause of failed connections or additions if the percentage of the aggregate number indicated in field 726 is relatively high.

In some examples an eNB MDT report using some or all of the information maintained in an FC MDT log in the example format of FC MDT log format 700 may be generated by a macro cell eNB. Other information may be included in the eNB MDT report. For example, information from an eNB MDT log in the example format of eNB MDT log format 600. Also, additional gathered information may be maintained in an FC MDT log maintained at the macro cell eNB and examples are not limited to the fields described above for FC MDT log format 700. Also, a different grouping of measurements and/or gathered information may be used in an MDT log at the eNB as well as for reporting. Also, in the example of FIG. 7, the order of measurements and/or gathered information was chosen arbitrarily and for other examples that order and/or gathered information may vary.

Figure 8:
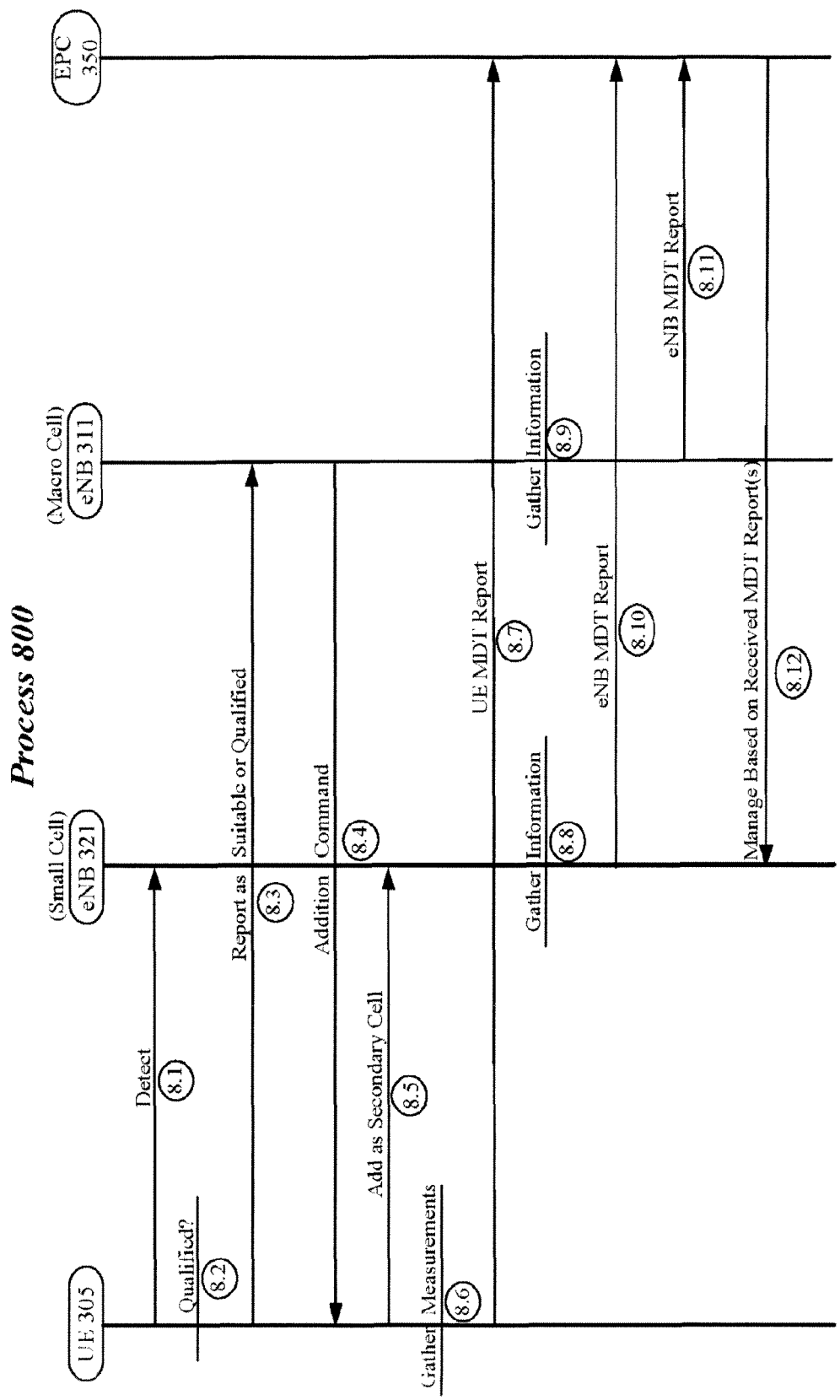
FIG. 8 illustrates an example process.

FIG. 8 illustrates an example process 800. In some examples, process 800 may be for gathering and reporting information associated with a small cell eNB serving as a possible secondary cell for an UE while a macro cell eNB serves as a primary cell. For these examples, elements of system 300 as shown in FIG. 3 may be used to illustrate example operations related to process 800. Also, information maintained in various MDT logs at either the UE or small/macro cell eNBs may include information mentioned above for the various log formats in FIGS. 5-7. However, the example process 800 is not limited to implementations using elements of system 300 or to various log formats in FIGS. 5-7.

Beginning at process 8.1 (Detect), logic and/or features at UE 305 may be capable of detecting small cell eNB 321. For example, the logic and/or features may detect downlink signals from small cell eNB 321 that may be strong enough to at least receive some information from small cell eNB 321. The information received may include a SystemInformationBlockType1 message that may be in the format of message format 400. The result of the detection process in the UE may be a list of small cells that are deemed suited to serve as a secondary cell.

Moving to process 8.2 (Qualified?), logic and/or features at UE 305 may determine whether small cell eNB 321 that is deemed suited to serve as a secondary cell with macro cell eNB 311 serving as a primary cell for UE 305 is actually qualified to do so. In some examples, the qualification may be based, at least in part, on information included in the received SystemInformationBlockType1 message. The qualification may also be based on other information such as channel characteristics for a possible connection with small cell eNB 321 to enable small cell eNB 321 to serve as a secondary cell for UE 305.

Moving to process 8.3 (Report as Suitable or Qualified), logic and/or features at UE 305 may report to macro cell eNB 311 that small cell eNB 321 is deemed suited or was determined to be qualified to serve as a secondary cell.

Moving to process 8.4 (Addition Command), logic and/or features at macro cell eNB 311 may send a command to add small cell eNB 321 as a secondary cell. In some examples the command may be sent from the macro cell eNB 311 to the UE 305 over an air interface and/or from the macro cell eNB 311 to the respective small cell eNB 321 over a backhaul interface.

Moving to process 8.5 (Add as Secondary Cell), logic and/or features at UE 305 may receive the command to add small cell eNB 321 as the secondary cell. In some examples, adding small cell eNB 321 may include the logic and/or features to cause UE 305 to maintain a first connection with macro cell eNB 311 and to establish and/or maintain a second connection with small cell eNB 321.

Moving to process 8.6 (Gather Measurements), logic and/or features at UE 305 may gather measurements or information associated with detecting small cell eNB 321, adding small cell eNB 321, maintaining the first connection with macro cell eNB 311 or establishing the second connection with small cell eNB 321. According to some examples, the gathered measurements or information may be maintained in an MDT log in the example format of UE MDT log format 500.

Moving to process 8.7 (UE MDT Report), logic and/or features at UE 305 may send gathered measurements and/or information associated with the gathered measurements in an UE MDT report to a management entity for EPC 350. The gathered measurements or information may be obtained from the UE MDT log that may include measurements or information as described for UE MDT log format 500 shown in FIG. 5.

Moving to process 8.8 (Gather Information), logic and/or features at small cell eNB 321 may be capable of gathering information associated with serving as a secondary cell for UE 305. According to some examples, the gathered information may be maintained in an eNB MDT log in the example format of eNB MDT log format 600.

Moving to process 8.9 (Gather Information), logic and/or features at macro cell eNB 311 may be capable of gathering information associated with eNB 321 serving as a secondary cell for UE 305. According to some examples, the gathered information may be maintained in an eNB MDT log in the example format of eNB MDT log format 600 and/or FC MDT log format 700.

Moving to process 8.10 (eNB MDT Report), logic and/or features at small cell eNB 321 may send gathered information in an eNB MDT report to the management entity for EPC 350. The gathered information may be obtained from the eNB MDT log that may include information as described for eNB MDT log format 600 shown in FIG. 6.

Moving to process 8.11 (eNB MDT Report), logic and/or features at macro cell eNB 311 may send gathered information in an eNB MDT report to the management entity for EPC 350. The gathered information may be obtained from the eNB MDT log that may include information as described for eNB MDT log format 600 shown in FIG. 6 and/or FC log format 700 shown in FIG. 7.

Moving to process 8.12 (Manage Based on Received MDT Report(s)), logic and/or features at EPC 350 may be capable of managing small cell eNB 321 based on received MDT reports from UE 305, eNB 321 or eNB 311. In some examples, managing small cell eNB 321 may include causing eNB 321 to be activated or deactivated from serving as a secondary cell for m UE 305 and/or for serving as a secondary cell for other UEs. In some examples, managing small cell eNB 321 may include taking energy saving schemes or power consumption policies or individual subscriber profiles into account for making small cell eNB activation or deactivation decisions. Process 800 may then come to an end.

According to some examples, the "Addition Command" in process 8.4 may be issued by macro cell eNB 311 based on an indication received from EPC 350. This indication may be an inherent part of process 8.12. In other words, the order of the process steps described in FIG. 8 may vary, and in other examples process 8.4 may be part of process 8.12, or EPC 350 may be informed about the qualification of a particular small cell eNB 321 after process 8.3, and processes 8.4, 8.5 and so on may follow process 8.12.

Figure 9:
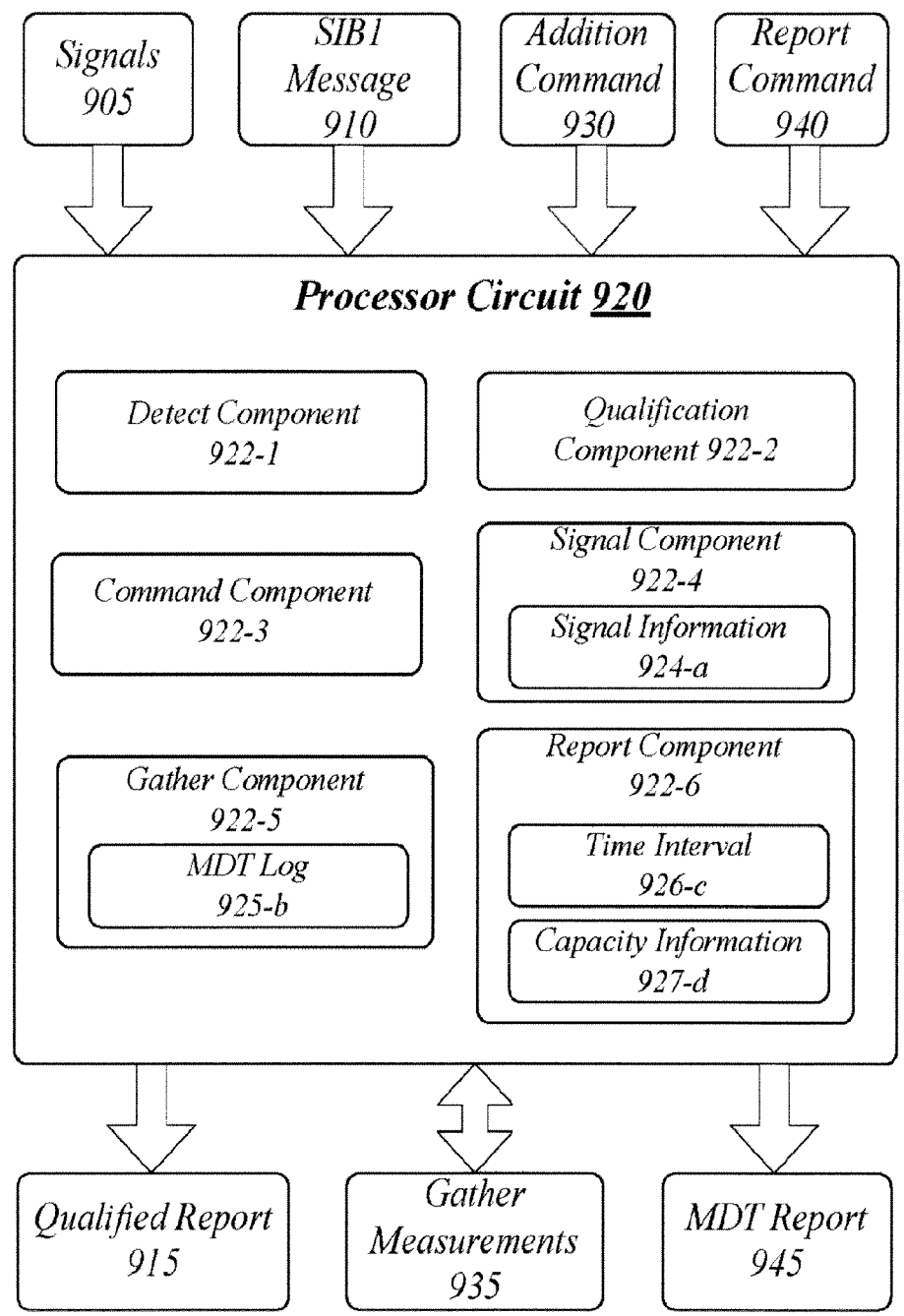
FIG. 9 illustrates an example block diagram for a first apparatus.

FIG. 9 illustrates a block diagram for an example first apparatus. As shown in FIG. 9, the example first apparatus includes apparatus 900. Although apparatus 900 shown in FIG. 9 has a limited number of elements in a certain topology, it may be appreciated that the apparatus 900 may include more or less elements in alternate topologies as desired for a given implementation.

The apparatus 900 may comprise a computer-implemented apparatus 900 having a processor circuit 920 arranged to execute one or more software components 922-*a*. It is worthy to note that "a" and "b" and "c" and similar designators as used herein are intended to be variables representing any positive integer. Thus, for example, if an implementation sets a value for a=6, then a complete set of software components 922-*a* may include components 922-1, 922-2, 922-3, 922-4, 922-5 and 922-6. The examples are not limited in this context.

According to some examples, apparatus 900 may be implemented in user equipment (UE 105, 205 or 305) capable of operating in compliance with one or more 3GPP LTE Specifications. For example, apparatus 900 may be capable of communicatively coupling to an LTE and/or LTE-A compliant wireless network via one or more eNBs that may be managed by an EPC. The examples are not limited in this context.

In some examples, as shown in FIG. 9, apparatus 900 includes processor circuit 920. Processor circuit 920 may be generally arranged to execute one or more software components 922-*a*. The processing circuit 920 can be any of various commercially available processors, including without limitation an AMD® Athlon®, Duron® and Opteron® processors; ARM® application, embedded and secure processors; Qualcomm® Snapdragon, IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi-processor architectures may also be employed as processing circuit 920. According to some examples, processor circuit 920 may also be an application specific integrated circuit (ASIC) and at least some components 922-*a* may be implemented as hardware elements of the ASIC.

According to some examples, apparatus 900 may include a detect component 922-1. Detect component 922-1 may be executed by processor circuit 920 to detect a small cell eNB. For these examples, detect component 922-1 may detect the small cell eNB via detection of signals 905 transmitted from the detected small cell eNB. For these examples, the detect component 922-1 may decide whether a detected small cell eNB is deemed suitable for serving as a secondary cell with a macro cell eNB serving as a primary cell for the UE that includes apparatus 900.

In some examples, apparatus 900 may also include a qualification component 922-2. Qualification component 922-2 may be executed by processor circuit 920 to determine whether the small cell eNB is suitable for serving as a secondary cell with a macro cell eNB serving as a primary cell for the UE that includes apparatus 900. Qualification component 922-2 may also report to the macro cell eNB that the small cell eNB is qualified based on the determination. For these examples, qualification component 922-2 may determine the small cell eNB's qualification based on at least a SystemInformationBlockType1 message received in SIB1 message 910 transmitted from the small cell eNB. The SystemInformationBlockType1 message received in SIB1 message 910 may appear in the example format of message format 400 shown above for FIG. 4 and may indicate that the small cell eNB is qualified to serve as the secondary cell. Alternatively or additionally, for determining whether the small cell is actually suitable or qualified to serve as a secondary cell, qualification component 922-2 may evaluate gathered measurements or information derived from those gathered measurements associated with detecting the small cell, or adding the small cell.

Qualification component 922-2 may send qualified report 915 to the macro cell to indicate the small cell eNB's qualification.

In some examples, apparatus 900 may also include a command component 922-3. Command component 922-3 may be executed by processor circuit 920 to receive a command from the macro cell eNB to add the small cell eNB as the secondary cell. For these examples, the command may be included in addition command 930. As part of adding the small cell eNB, command component 922-3 may cause the UE to maintain a first connection with the macro cell eNB serving as the primary cell and to establish or maintain a second connection with the small cell eNB serving as the secondary cell.

According to some examples, apparatus 900 may also include a signal component 922-4. Signal component 922-4 may be executed by processor circuit 920 to measure a radio reference signal received power (RSRP) from the small cell eNB, or any other parameter suited for signal strength measurements, such as reference signal received quality (RSRQ) and/or received signal strength indicator) (RSSI). For these examples, the RSRP, RSRQ or RSSI may be based on signals 905. Signal component 922-4 may be capable of maintaining signal information 924-*a* (e.g., in a lookup table (LUT)) that may include information to indicate a given threshold which the RSRP, RSRQ or RSSI needs to meet to establish and maintain the second connection with the small cell eNB. Qualification component 922-2 may be capable of using an indication from signal component 922-4 that the RSRP (or any other parameter suited for signal strength measurements) exceeds the given threshold to further determine that the small cell is qualified to serve as the secondary cell. Signal component 922-4 may also continually measure signals 905 not only during the detecting of the small cell but also during the adding of the small cell eNB as the secondary cell and while the UE maintains the second connection with the small cell eNB.

In some examples, apparatus 900 may also include a gather component 922-5. Gather component 922-5 may be executed by processor circuit 920 to gather measurements associated with detecting the small cell eNB, adding the small cell eNB as the secondary cell or maintaining the second connection with the small cell eNB. For these examples, gather measurements 935 may include information measured by signal component 922-4 as well as other types of measurements. Gather component 922-5 may be capable of maintaining the gathered measurements in MDT log 925-*b*. MDT log 925-*b* may be maintained in a memory at the UE that may include, but is not limited to, a non-volatile memory device. MDT log 925-*b* may include at least some of the information described above for example UE MDT log format 500 shown in FIG. 5.

According to some examples, apparatus 900 may also include a report component 922-6. Report component 922-6 may be executed by processor circuit 920 to send gathered measurements or information derived from those gathered measurements in an MDT report to a management entity for the EPC. For these examples, the MDT report may be included in MDT report 945 and may include at least some of the information described above for example UE MDT log format 500 shown in FIG. 5.

In some examples, report component 922-6 may be capable of maintaining time interval 926-*c* (e.g., in a LUT) that may indicate one or more time intervals for sending MDT reports to the management entity for the EPC. Report component 922-6 may also be capable of maintaining capacity information 927-*d* (e.g., in a LUT) that may indicate what capacity level in the memory used by gather component 922-5 triggers sending an indication to an infrastructure element (e.g., an eNB or base station) to retrieve an available MDT report or requesting permission to send the MDT report(s) to the management entity for the EPC.

Various components of apparatus 900 and a device implementing apparatus 900 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 10:
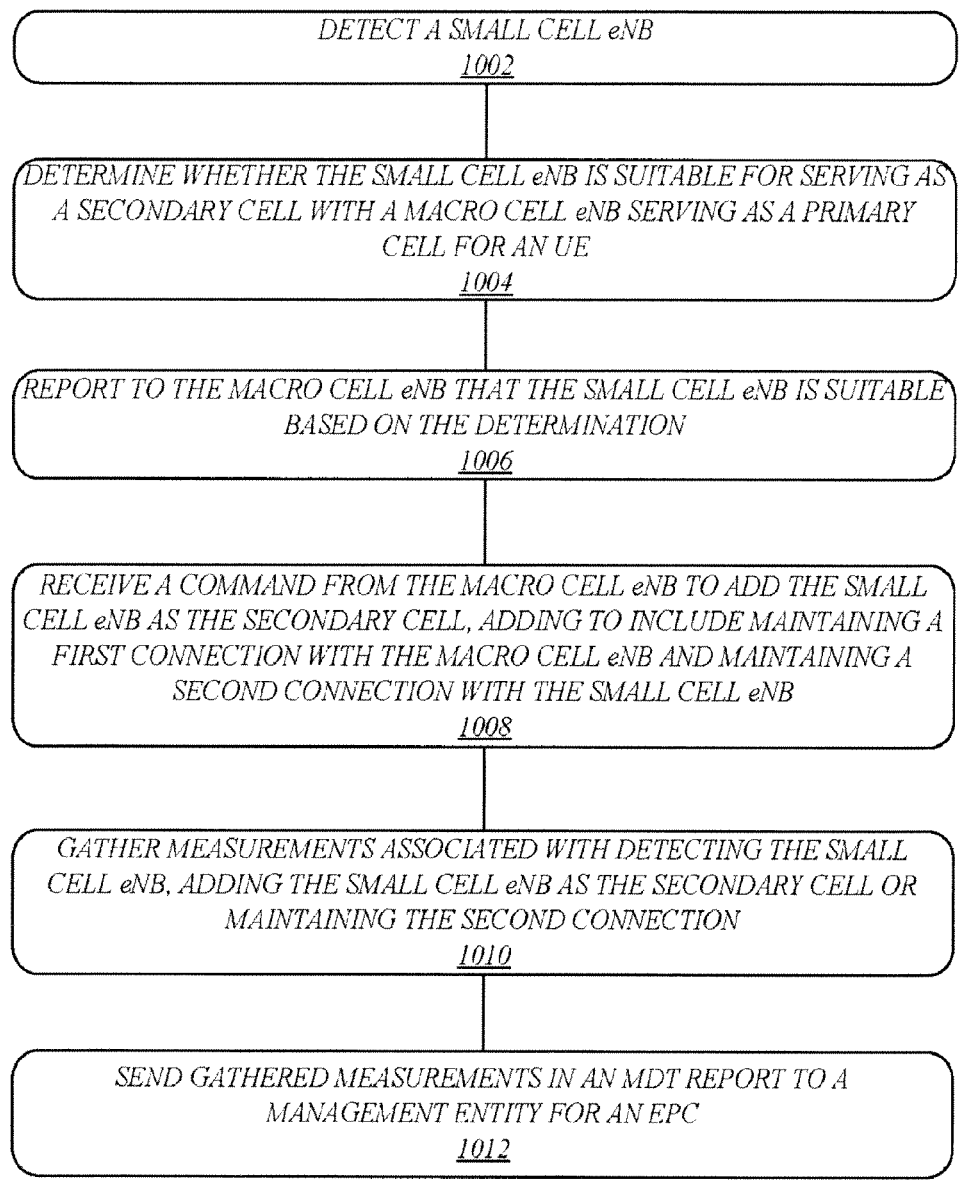
FIG. 10 illustrates an example of a first logic flow.

FIG. 10 illustrates an example of a logic flow 1000. Logic flow 1000 may be representative of some or all of the operations executed by one or more logic, features, or devices described herein, such as apparatus 900. More particularly, logic flow 1000 may be implemented by detect component 922-1, qualification component 922-2, command component 922-3, signal component 922-4, gather component 922-5 or report component 922-6.

In the illustrated example shown in FIG. 10, logic flow 1000 at block 1002 may detect a small cell eNB. In some examples, detect component 922-1 may be capable of detecting the small cell eNB.

According to some examples, logic flow 1000 at block 1004 may determine whether the small cell eNB is suitable for serving as a secondary cell with a macro cell eNB serving as a primary cell for the UE that includes apparatus 900. For these examples, qualification component 922-2 may be capable of making the suitability or qualification determination.

In some examples, logic flow 1000 at block 1006 may report to the macro cell eNB that the small cell eNB is suitable based on the determination. For these examples, report component 922-3 may be capable of causing the report to be sent to the macro cell eNB.

According to some examples, logic flow 1000 at block 1008 may receive a command from the macro cell eNB to add the small cell eNB as the secondary cell. Logic flow 1000 at block 1008 may also add the small cell eNB by maintaining a first connection with the macro cell eNB and maintaining a second connection with the small cell eNB. For these examples, command component 922-3 may be capable of receiving the command and causing the UE to maintain the first and second connections.

In some examples, logic flow 1000 at block 1010 may gather measurements associated with detecting the small cell eNB, adding the small cell eNB as the secondary cell or maintaining the second connection. For these examples, gather component 922-5 may be capable of gathering the measurements.

According to some examples, logic flow 1000 at block 1012 may send gathered measurements in an MDT report to a management entity for an EPC. For these examples, report component 922-6 may be capable of sending the MDT report to the management entity.

Figure 11:
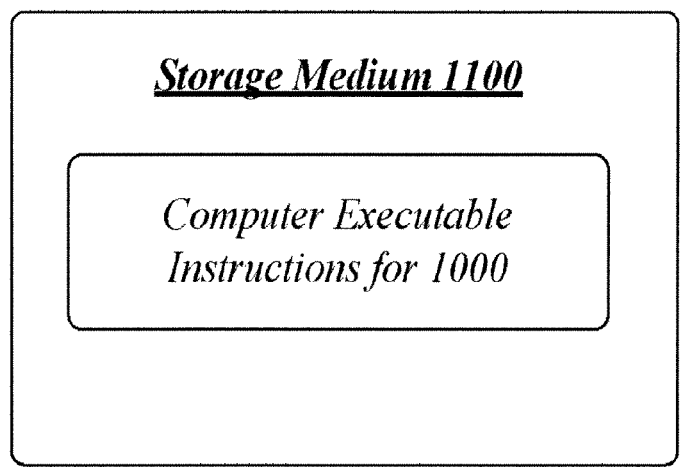
FIG. 11 illustrates an example of a first storage medium.

FIG. 11 illustrates an embodiment of a storage medium 1100. The storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
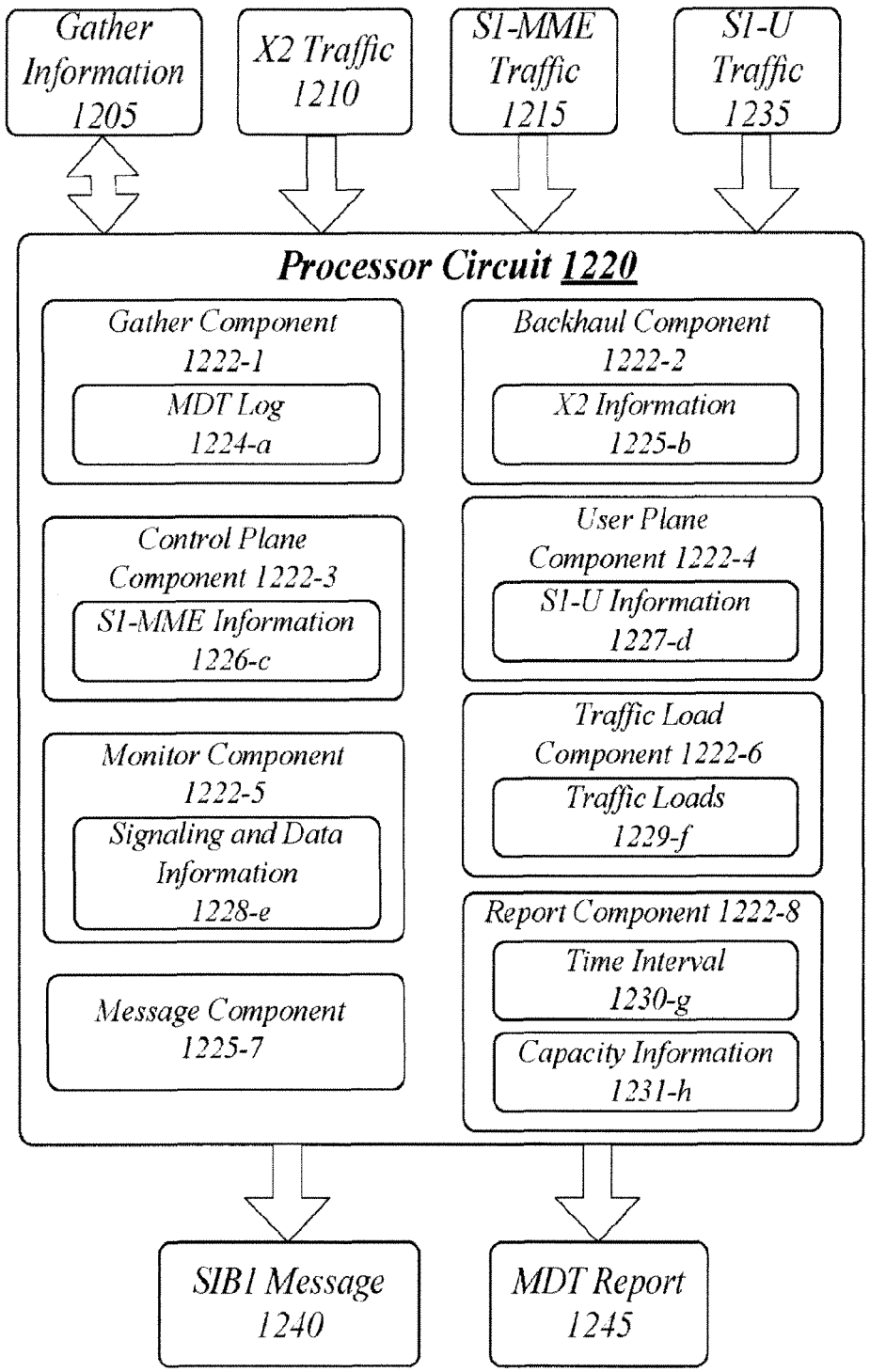
FIG. 12 illustrates an example block diagram for a second apparatus.

FIG. 12 illustrates a block diagram for an example second apparatus. As shown in FIG. 12, the example second apparatus includes apparatus 1200. Although apparatus 1200 shown in FIG. 12 has a limited number of elements in a certain topology, it may be appreciated that the apparatus 1200 may include more or less elements in alternate topologies as desired for a given implementation.

The apparatus 1200 may comprise a computer-implemented apparatus 1200 having a processor circuit 1220 arranged to execute one or more software components 1222-*a*. It is worthy to note that "a" and "b" and "c" and similar designators as used herein are intended to be variables representing any positive integer. Thus, for example, if an implementation sets a value for a=8, then a complete set of software components 1222-*a* may include components 1222-1, 1222-2, 1222-3, 1222-4, 1222-5, 1222-6, 1222-7 and 1222-8. The examples are not limited in this context.

According to some examples, apparatus 1200 may be implemented in system equipment (e.g., located at or with eNBs 311 or 321), such as network equipment for a communications system or network compliant with one or more 3GPP LTE Specifications. For example, apparatus 1200 may be implemented as part of a base station or eNB for an LTE and/or LTE-A compliant wireless network. Although some examples are described with reference to a base station or eNB, examples may utilize any network equipment for a communications system or network. The examples are not limited in this context In some examples, as shown in FIG. 12, apparatus 1200 includes processor circuit 1220. Processor circuit 1220 may be generally arranged to execute one or more software components 1222-*a*. The processing circuit 1220 can be any of various commercially available processors to include but not limited to the processors mentioned above for apparatus 900. Also, according to some examples, processor circuit 1220 may also be an ASIC and at least some components 1222-*a* may be implemented as hardware elements of the ASIC.

According to some examples, apparatus 1200 may include a gather component 1222-1. Gather component 1222-1 may be executed by processor circuit 1220 to gather information associated with one or more small cell eNBs capable of separately serving as a secondary cell for an UE that also has a macro cell eNB serving as a primary cell. For these examples, gather information 1205 may include gathered information that depends on whether the eNB that includes apparatus 1200 is a small cell eNB or a macro cell eNB. If a small cell eNB, gathered information 1205 may be specific to the small cell eNB. If a macro cell eNB, gathered information 1205 may include information for the macro cell eNB and one or more small cell eNBs. In either case, gather component 1222-1 may be capable of maintaining gathered information in MDT log 1224-*a*. MDT log 1224-*a* may be maintained in a memory at the UE that may include, but is not limited to, a non-volatile memory device. MDT log 1224-*a* may include at least some of the information described above for example eNB MDT log format 600 or FC MDT log format 700 shown in FIGS. 6 and 7.

In some examples, apparatus 1200 may also include a backhaul component 1222-2. Backhaul component 1222-2 may be executed by processor circuit 1220 to couple with one or more small cell eNBs through separate backhaul channels via an X2 interface. Backhaul component 1222-2 may be capable of maintaining X2 information 1225-*b* in a data structure such as a LUT. X2 information 1225-*b* may include protocol information to facilitate an eNB's communication with other eNB(s) through the separate backhaul channels via the X2 interface. The backhaul channels may facilitate coordinating between a macro cell eNB and a small cell eNB to establish a possible dual connection with the UE. In some examples, the backhaul channels may also be used by small cell eNBs not having direct links into the EPC to forward or receive information through a macro cell eNB having a direct link to the EPC.

In some examples, apparatus 1200 may also include a control plane component 1222-3. Control plane component 1222-3 may be executed by processor circuit 1220 to couple with an MME for the EPC through a control plane channel via an S1-MME interface. Control plane component 1222-3 may be capable of maintaining S1-MME information 1226-*c*. e.g., in a LUT. S1-MME information 1226-*c* may include protocol information to facilitate an eNB's communication with the MME through the control plane channel via the S1-MME interface.

According to some examples, apparatus 1200 may also include a user plane component 1222-4. User plane component 1222-4 may be executed by processor circuit 1220 to couple with an SWG for the EPC through a user plane channel via an S1-U interface. User plane component 1222-4 may be capable of maintaining S1-U information 1227-*d*, e.g., in a LUT. S1-U information 1227-*d* may include protocol information to facilitate an eNB's communication with the SWG through the user plane channel via the SI-U interface.

In some examples, apparatus 1200 may also include a monitor component 1222-5. Monitor component 1222-5 may be executed by processor circuit 1220 to monitor signaling and data routed via X2, S1-MME or S1-U interfaces. Monitor component 1222-5 may be capable of maintaining signaling and data information 1228-*e*. Signaling and data information 1228-*e* may include signaling and data (traffic) information obtained by monitoring X2 traffic 1210, S1-MME traffic 1215 or S1-U traffic 1235. Signaling and data information 1228-*e* may be temporarily maintained in a data structure such as a LUT.

According to some examples, apparatus 1200 may also include a traffic load component 1222-6. Traffic load component 1222-6 may be executed by processor circuit 1220 to determine a traffic load on one or more small cell eNBs based on signaling and data information 1228-*e* gathered by monitor component 1222-5. Traffic load component 1222-6 may be capable of maintaining traffic loads 1229-*f* (e.g., in a LUT). Traffic loads 1229-*f* may be accessible to gather component 1222-1 to add to MDT log 1224-*a* traffic loads for the one or more small cell eNBs.

In some examples, apparatus 1200 may also include a message component 1222-7. Message component 1222-7 may be executed by processor circuit 1220 to cause a broadcast of a SIB1 message to indicate a capability to serve as a second cell for an UE. For these examples, apparatus 1200 may be included in a small cell eNB. Also, for these examples, the SIB1 message may be included in an SIB1 message 1240 that may be received by UEs within a small cell area being served by the small cell eNB.

According to some examples, apparatus 1200 may also include a report component 1222-8. Report component 1222-8 may be executed by processor circuit 1220 to send gathered information in an MDT report to a management entity for the EPC. For these examples, the MDT report may be included in MDT report 1245 and may include at least some of the information described above for example eNB MDT log format 600 or FC MDT log format 700 shown in FIGS. 6 and 7.

In some examples, report component 1222-8 may be capable of maintaining time interval 1230-*g* (e.g., in a LUT) that may indicate one or more time intervals for sending MDT reports to the management entity. Report component 1222-8 may also be capable of maintaining capacity information 931-*h* (e.g., in a LUT) that may indicate at what capacity level in the memory used by gather component 1222-1 needs to be reached to trigger sending an indication to an infrastructure element to retrieve the available MDT reports.

Various components of apparatus 1200 and a device implementing apparatus 1200 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 13 illustrates an example of a logic flow 1300. Logic flow 1300 may be representative of some or all of the operations executed by one or more logic, features, or devices described herein, such as apparatus 1200. More particularly, logic flow 1300 may be implemented by gather component 1222-1 or report component 1222-8.

In the illustrated example shown in FIG. 13, logic flow 1300 at block 1302 may gather information associated with one or more small cell eNBs capable of separately serving as a secondary cell for an UE that also has a macro cell eNB serving as a primary cell. For these examples, gather component 1222-1 may gather the information.

According to some examples, logic flow 1300 at block 1304 may send gathered information in an MDT report to a management entity for an EPC. For these examples, report component 1222-8 may send the MDT report to the MME.

Figure 14:
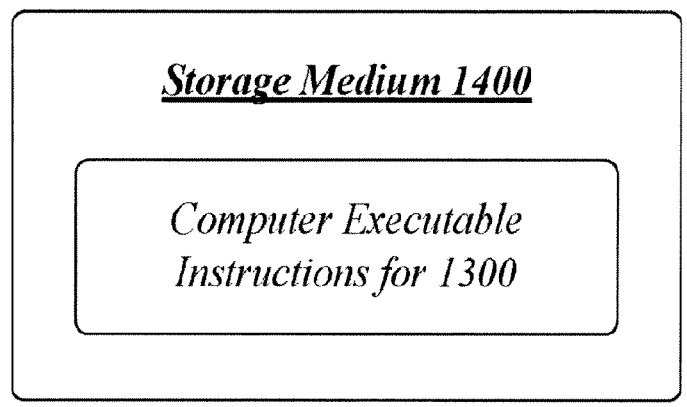
FIG. 14 illustrates an example of a second storage medium.

FIG. 14 illustrates an embodiment of a storage medium 1400. The storage medium 1400 may comprise an article of manufacture. In some examples, storage medium 1400 may include any non-transitory computer readable medium or machine readable medium, such as an optical, magnetic or semiconductor storage. Storage medium 1400 may store various types of computer executable instructions, such as instructions to implement logic flow 1300. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 15:
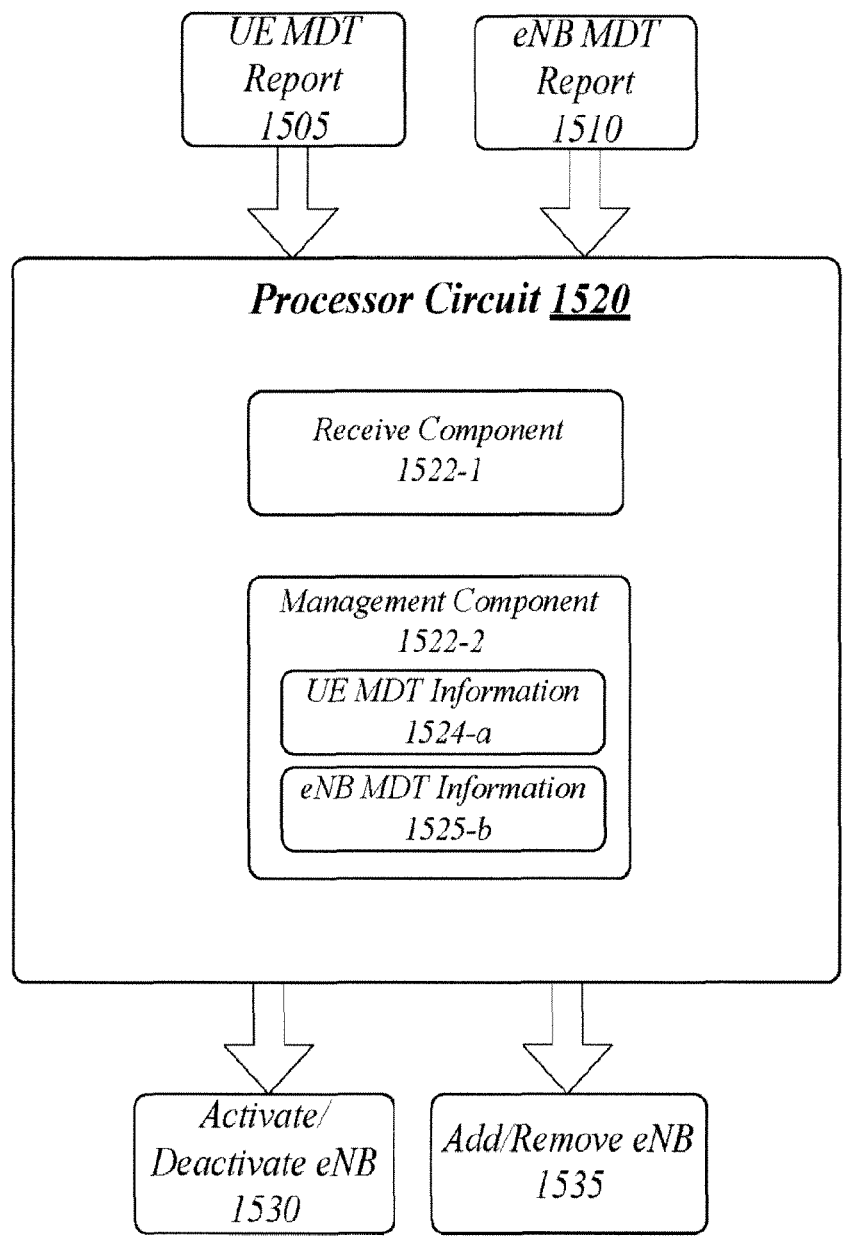
FIG. 15 illustrates an example block diagram for a third apparatus.

FIG. 15 illustrates a block diagram for an example third apparatus. As shown in FIG. 15, the example third apparatus includes apparatus 1500. Although apparatus 1500 shown in FIG. 15 has a limited number of elements in a certain topology, it may be appreciated that the apparatus 1500 may include more or less elements in alternate topologies as desired for a given implementation.

The apparatus 1500 may comprise a computer-implemented apparatus 1500 having a processor circuit 1520 arranged to execute one or more software components 1522-a. It is worthy to note that "a" and "b" and "c" and similar designators as used herein are intended to be variables representing any positive integer. Thus, for example, if an implementation sets a value for a=2, then a complete set of software components 1522-a may include components 1522-1 and 1522-2. The examples are not limited in this context.

According to some examples, apparatus 1500 may be located with system equipment (e.g., located at or with a management entity for an EPC), such as network equipment for a communications system or network compliant with one or more 3GPP LTE Specifications. For example, apparatus 1500 may be implemented as part of a management entity for an LTE and/or LTE-A compliant wireless network such as an MME, TCE, MDT server or an O&M entity. Although some examples are described with reference to a management entity for an EPC, examples may utilize any network equipment in addition to those mentioned above that may be at the EPC and/or may be associated with managing small cell eNBs in a wireless network. The examples are not limited in this context In some examples, as shown in FIG. 15, apparatus 1500 includes processor circuit 1520. Processor circuit 1520 may be generally arranged to execute one or more software components 1522-a. The processing circuit 1520 can be any of various commercially available processors to included, but not limited to the processors mentioned above for apparatus 900. Also, according to some examples, processor circuit 1520 may also be an ASIC and at least some components 1522-a may be implemented as hardware elements of the ASIC.

According to some examples, apparatus 1500 may include a receive component 1522-1. Receive component 1522-1 may be executed by processor circuit 1520 to receive an MDT report originating from an UE, a macro cell eNB or a small cell eNB. For these examples, the MDT report may be included in UE MDT report 1505 from the UE or in eNB MDT 1510 from either the macro cell eNB or the small cell eNB.

In some examples, apparatus 1500 may include a management component 1522-2. Management component 1522-1 may be executed by processor circuit 1520 to manage one or more small cell eNBs based on the MDT report. The one or more small cell eNBs may be separately capable of serving as a secondary cell for the UE while the macro cell eNB serves as a primary cell for the UE. Managing by management component 1522-1 may include causing at least some of the one or more small cell eNBs to be activated to serve as potential secondary cells for the UE or to be deactivated from serving as potential secondary cells for the UE. Activate/deactivate eNB 1530 may include messages that management component 1522-2 may cause to be sent for the MME to activate or deactivate the one or more small cell eNBs. Managing by management component 1522-1 may also include adding or removing one or more small cell eNBs. Add/remove eNB 1535 may include messages that management component 1522-2 may cause to be sent for the MME to add or remove the one or more small cell eNBs. Managing may also include taking energy saving schemes or power consumption policies or individual subscriber profiles into account for making small cell eNB activation or deactivation decisions.

According to some examples, management component 1522-2 may be capable of maintaining UE MDT information 1524-a and eNB MDT information 1525-b in a data structure such as a non-volatile or volatile memory device. For these examples, UE MDT information 1524-a may include information received from one or more UEs via UE MDT reports that may have included at least some of the information described above for example UE MDT log format 500 shown in FIG. 5. Also, eNB MDT information 1525-b may include information received from either small cell or macro cell eNBs via eNB MDT reports that may have included at least some of the information described above for example eNB MDT log format 600 or FC MDT log format 700 shown in FIGS. 6 and 7.

Various components of apparatus 1500 and a device implementing apparatus 1500 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Figure 16:
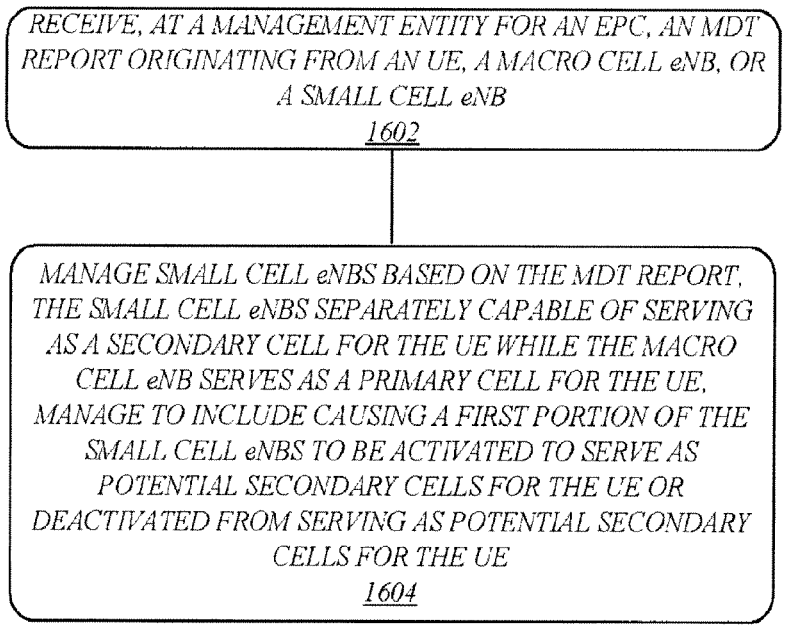
FIG. 16 illustrates an example of a third logic flow.

FIG. 16 illustrates an example of a logic flow 1600. Logic flow 1600 may be representative of some or all of the operations executed by one or more logic, features, or devices described herein, such as apparatus 1500. More particularly, logic flow 1600 may be implemented by receive component 1522-1 or manage component 1522-2.

In the illustrated example shown in FIG. 16, logic flow 1600 at block 1602 may receive, at a management entity for an EPC, an MDT report originating form an UE, a macro cell eNB or a small cell eNB. For these examples, receive component 1522-1 may receive the MDT report.

According to some examples, logic flow 1600 at block 1604 may manage small cell eNBs based on the MDT report. The small cell eNBs may be separately capable of serving as a secondary cell for the UE while the macro cell eNB serves as a primary cell for the UE. Managing may include causing a first portion of the small cell eNBs to be activated to serve as potential secondary cells for the UE and deactivated from serving as potential secondary cells for the UE. For these examples, manage component 1522-2 may manage the small cell eNBs based on the MDT report.

FIG. 17 illustrates an embodiment of a storage medium 1700. The storage medium 1700 may comprise an article of manufacture. In some examples, storage medium 1700 may include any non-transitory computer readable medium or machine readable medium, such as an optical, magnetic or semiconductor storage. Storage medium 1700 may store various types of computer executable instructions, such as instructions to implement logic flow 1600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 18:
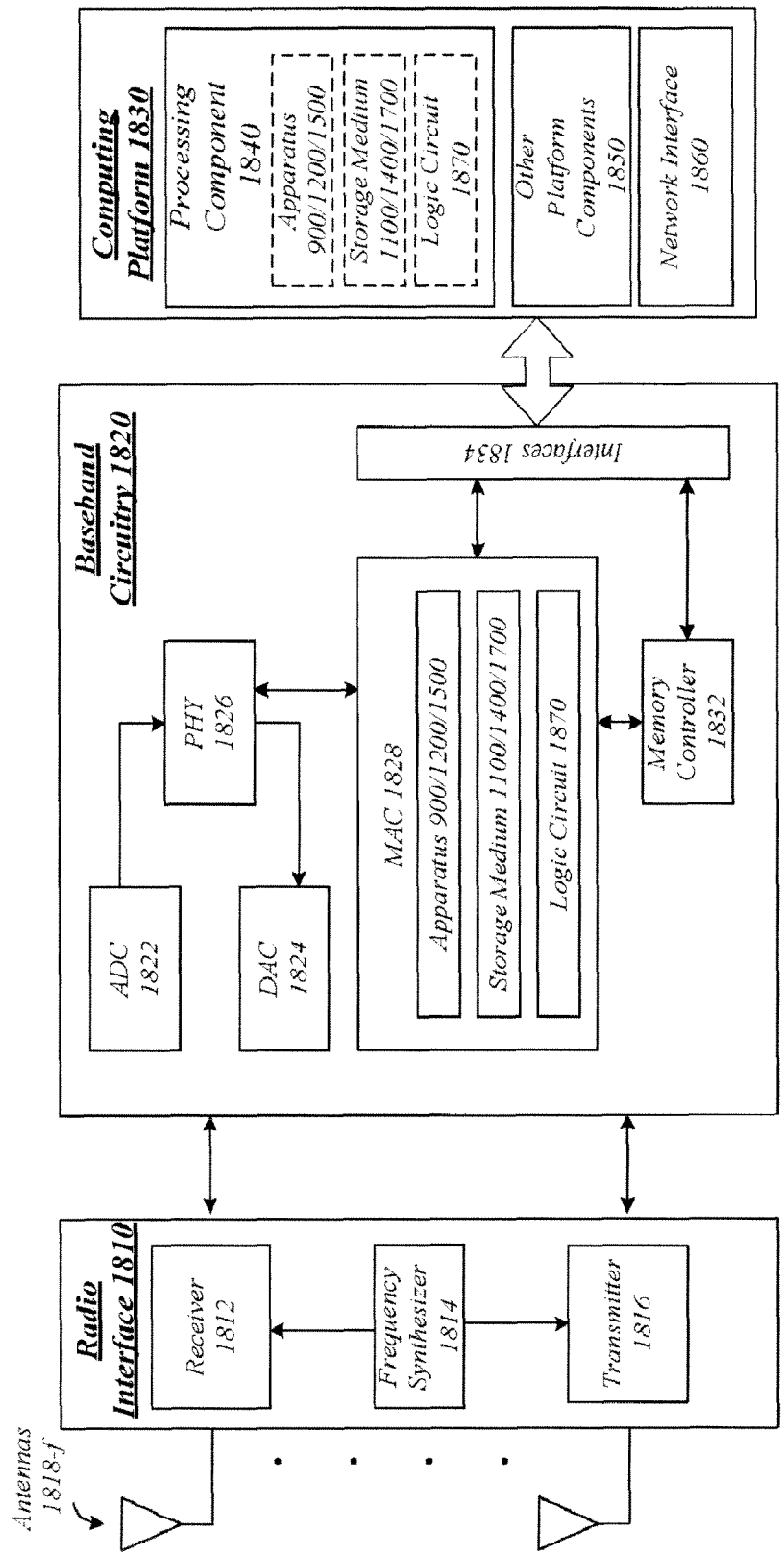
FIG. 18 illustrates an example of a device.

FIG. 18 illustrates an embodiment of a device 1800 for use in a broadband wireless access network. Device 1800 may implement, for example, apparatus 900/1200/1500, storage medium 1100/1400/1700 and/or a logic circuit 1870. The logic circuit 1870 may include physical circuits to perform operations described for apparatus 900/1200/1500. As shown in FIG. 18, device 1800 may include a radio interface 1810, baseband circuitry 1820, and computing platform 1830, although examples are not limited to this configuration.

The device 1800 may implement some or all of the structure and/or operations for the apparatus 900/1200/1500, storage medium 1100/1400/1700 and/or logic circuit 1870 in a single computing entity, such as entirely within a single device. Alternatively, the device 1800 may distribute portions of the structure and/or operations for apparatus 900/1200/1500, storage medium 1100/1400/1700 and/or logic circuit 1870 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The examples are not limited in this context.

In one embodiment, radio interface 1810 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM) symbols) although the embodiments are not limited to any specific over-the-air interface or modulation scheme. Radio interface 1810 may include, for example, a receiver 1812, a transmitter 1816 and/or a frequency synthesizer 1814. Radio interface 1810 may include bias controls, a crystal oscillator and/or one or more antennas 1818-$f$. In another embodiment, radio interface 1810 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1820 may communicate with radio interface 1810 to process receive and/or transmit signals and may include, for example, an analog-to-digital converter 1822 for down converting received signals, a digital-to-analog converter 1824 for up converting signals for transmission. Further, baseband circuitry 1820 may include a baseband or physical layer (PHY) processing circuit 1826 for PHY link layer processing of respective receive/transmit signals. Baseband circuitry 1820 may include, for example, a processing circuit 1828 for medium access control (MAC)/data link layer processing. Baseband circuitry 1820 may include a memory controller 1832 for communicating with MAC processing circuit 1828 and/or a computing platform 1830, for example, via one or more interfaces 1834.

In some embodiments, PHY processing circuit 1826 may include a frame construction and/or detection module, in combination with additional circuitry such as a buffer memory, to construct and/or deconstruct communication frames (e.g., containing subframes). Alternatively or in addition, MAC processing circuit 1828 may share processing for certain of these functions or perform these processes independent of PHY processing circuit 1826. In some embodiments, MAC and PHY processing may be integrated into a single circuit.

Computing platform 1830 may provide computing functionality for device 1800. As shown, computing platform 1830 may include a processing component 1840. In addition to, or alternatively of, baseband circuitry 1820 of device 1800 may execute processing operations or logic for apparatus 900/1200/1500, storage medium 1100/1400/1700, and logic circuit 1870 using the processing component 1830. Processing component 1840 (and/or PHY 1826 and/or MAC 1828) may comprise various hardware elements, software elements, or a combination of both. Examples of hardware elements may include devices, logic devices, components, processors, microprocessors, circuits, processor circuits (e.g., processor circuit 920, 1220 or 1520), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1830 may further include other platform components 1850. Other platform components 1850 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1830 may further include a network interface 1860. In some examples, network interface 1860 may include logic and/or features to support X2, S1-MME or S1-U interfaces as described in one or more 3GPP LTE or LTE-A specifications or standards. For these examples, network interface 1860 may enable an apparatus 1800 or 1500 located at an eNB, MME or SWG to communicatively couple through backhaul, control plane or user plane channels. In some other examples, network interface 1860 may include logic and/or features to support other communication interfaces described in the one or more 3GPP LTE or LTE-A specifications. For these examples, network interface 1860 may enable an apparatus 900 located with a UE or an apparatus 1200 located with an eNB to communicatively couple to one or more other eNBs via a wireless communications link.

Device 1800 may be, for example, user equipment, a computer, a personal computer (PC), a desktop computer, a laptop computer, an ultrabook computer, a smartphone, a tablet computer, a notebook computer, a netbook computer, a server, a server array or server farm, a web server, a network server, an Internet server, a work station, a minicomputer, a main frame computer, a supercomputer, a network appliance, a web appliance, a distributed computing system, multiprocessor systems, processor-based systems, wireless access point, base station, node B, evolved node B, subscriber station, mobile subscriber center, radio network controller, router, hub, gateway, bridge, switch, machine, or combination thereof. Accordingly, functions and/or specific configurations of device 1800 described herein, may be included or omitted in various embodiments of device 1800, as suitably desired. In some embodiments, device 1800 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 1800 may be implemented using single input single output (SISO) architectures. However, certain implementations may include multiple antennas (e.g., antennas 1818-f) for transmission and/or reception using adaptive antenna techniques for beamforming or spatial division multiple access (SDMA) and/or using multiple input multiple output (MIMO) communication techniques.

The components and features of device 1800 may be implemented using any combination of discrete circuitry, application specific integrated circuits (ASICs), logic gates and/or single chip architectures. Further, the features of device 1800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1800 shown in the block diagram of FIG. 18 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in examples.

Figure 19:
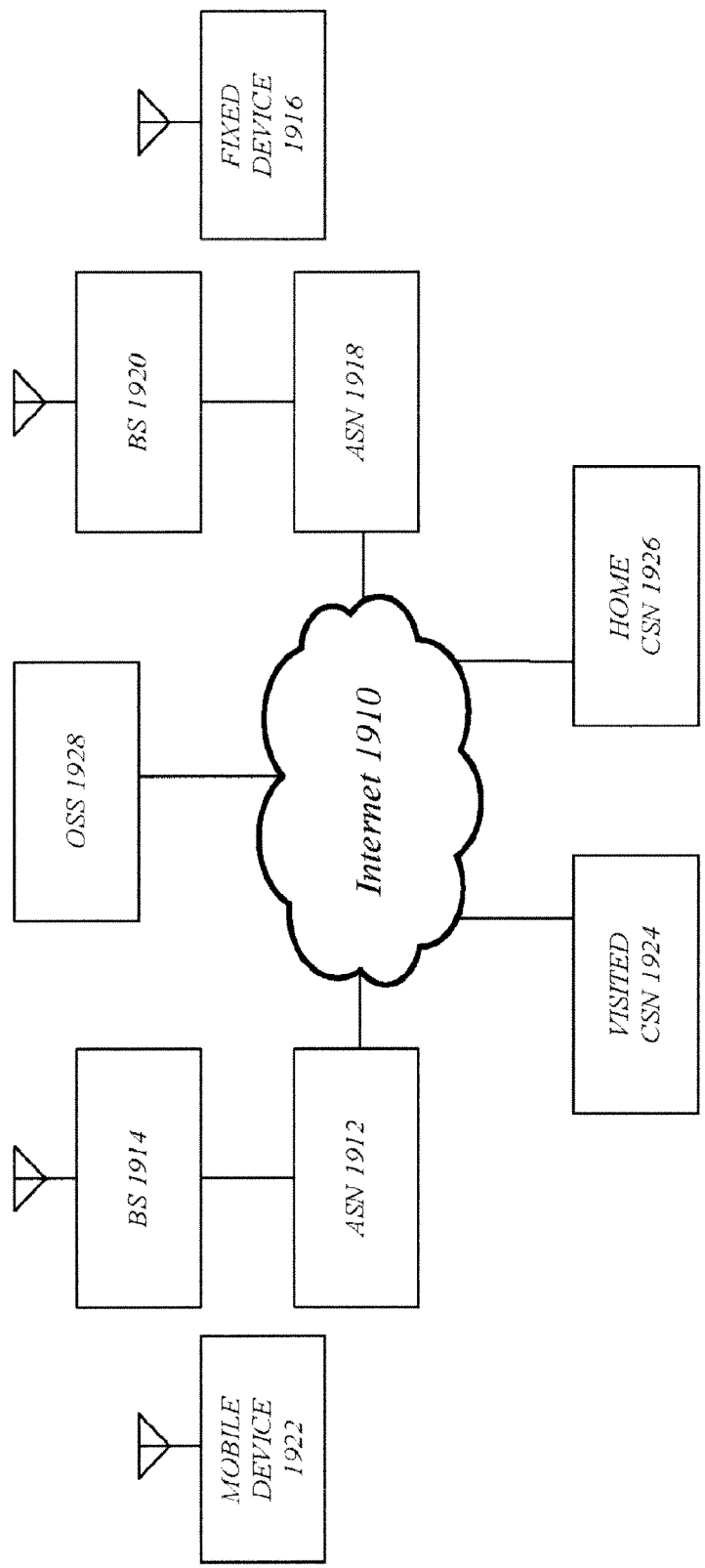
FIG. 19 illustrates an example of a broadband wireless access system.

FIG. 19 illustrates an embodiment of a broadband wireless access system 1900. As shown in FIG. 19, broadband wireless access system 1900 may be an internet protocol (IP) type network comprising an internet 1910 type network or the like that is capable of supporting mobile wireless access and/or fixed wireless access to internet 1910. In one or more embodiments, broadband wireless access system 1900 may comprise any type of orthogonal frequency division multiple access (OFDMA) and/or multiple single carrier frequency division multiple access (multiple SC-FDMA) based wireless network, such as a system compliant with one or more of the 3GPP LTE Specifications and/or IEEE 802.16 Standards, and the scope of this disclosure is not limited in these respects.

In the exemplary broadband wireless access system 1900, access service networks (ASN) 1914, 1918 are capable of coupling with base stations (BS) 1914, 1920 (RRHs or eNBs), respectively, to provide wireless communication between one or more fixed devices 1916 and internet 1910, or one or more mobile devices 1922 and Internet 1910. One example of a fixed device 1916 and a mobile device 1922 is UE 120-1, with the fixed device 1916 comprising a stationary version of UE 120-1 and the mobile device 1922 comprising a mobile version of UE 120-1. ASN 1912 may implement profiles that are capable of defining the mapping of network functions to one or more physical entities on broadband wireless access system 1900. Base stations 1914, 1920 (or eNBs) may comprise radio equipment to provide RF communication with fixed device 1916 and mobile device 1922, such as described with reference to device 1900, and may comprise, for example, the PHY, MAC, RLC or PDCP layer equipment in compliance with a 3GPP LTE Specification or an IEEE 802.16 Standard. Base stations 1914, 1920 (or eNBs) may further comprise an IP backplane to couple to Internet 1910 via ASN 1912, 1918, respectively, although the scope of the claimed subject matter is not limited in these respects.

Broadband wireless access system 1900 may further comprise a visited connectivity service network (CSN) 1924 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1924 or home CSN 1926, and the scope of the claimed subject matter is not limited in these respects. Visited CSN 1924 may be referred to as a visited CSN in the case where visited CSN 1924 is not part of the regular service provider of fixed device 1916 or mobile device 1922, for example where fixed 1916 or mobile device 1922 is roaming away from their respective home CSN 1926, or where broadband wireless access system 1900 is part of the regular service provider of fixed device 1916 or mobile device 1922 but where broadband wireless access system 1900 may be in another location or state that is not the main or home location of fixed device 1916 or mobile device 1922.

Fixed device 1916 may be located anywhere within range of one or both base stations 1914, 1920, such as in or near a home or business to provide home or business customer broadband access to Internet 1910 via base stations 1914, 1920 and ASN 1912, 1918, respectively, and home CSN 1926. It is worthy to note that although fixed device 1916 is generally disposed in a stationary location, it may be moved to different locations as needed. Mobile device 1922 may be utilized at one or more locations if mobile device 1922 is within range of one or both base stations 1914, 1920, for example.

In accordance with one or more embodiments, operation support system (OSS) 1928 may be part of broadband wireless access system 1900 to provide management functions for broadband wireless access system 1900 and to provide interfaces between functional entities of broadband wireless access system 1900. Broadband wireless access system 1900 of FIG. 19 is merely one type of wireless network showing a certain number of the components of broadband wireless access system 1900, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

In some examples, an example first apparatus may include a processor circuit for an eNB capable of operating in compliance with one or more 3GPP LTE standards including LTE-Advanced (LTE-A). The first apparatus also including a gather component for execution by the processor circuit to gather information associated with one or more small cell eNBs capable of separately serving as a secondary cell for an UE that also has a macro cell eNB serving as a primary cell. The first apparatus also including a report component for execution by the processor circuit to send gathered information in a MDT report to a management entity for an EPC.

According to some examples for the first apparatus, the eNB may be the macro cell eNB serving as the primary cell.

In some examples where the eNB may be the macro cell eNB, the first apparatus may also include a backhaul component for execution by the processor circuit to couple with the one or more small cell eNBs through separate backhaul channels via an X2 interface. The first apparatus may also include a control plane component for execution by the processor circuit to couple to an MME for the EPC through a control plane channel via an S1-MME interface. The first apparatus may also include a user plane component for execution by the processor circuit to couple to a SGW for the EPC through a user plane channel via an S1-U interface.

According to some examples, where the eNB may be the macro cell eNB, the first apparatus may also include a monitor component for execution by the processor circuit to monitor signaling and data routed via the X2, S1-MME or S1-U interfaces. The first apparatus may also include a traffic load component for execution by the processor circuit to determine a traffic load on the one or more small cell eNBs based on signaling and data information gathered by the monitor component while monitoring the signaling and data routed via the X2, S1-MME or S1-U interfaces. For these examples, the gather component may include the traffic load determined by the traffic load component in the gathered information.

In some examples for the first apparatus where the eNB may be the macro cell eNB, the gather component to gather information associated with the one or more small cell eNBs may include the gathered information indicating one or more of a first time each of the one or more small cell eNBs are in an activated state, a second time each of the one or more small cell eNBs are in a deactivated state, a first percentage of time each of the small cell eNBs are in the activated state, a second percentage of time each of the one or more small cell eNBs are in the deactivated state or a third percentage of time each of the one or more small cell eNBs served as the secondary cell for the UE.

According to some examples for the first apparatus, the eNB may be a first small cell eNB from among the one or more small cell eNBs.

In some examples, where the eNB may be the first small cell eNB, the first apparatus may also include a backhaul component for execution by the processor circuit to couple with a backhaul channel to the macro cell eNB via an X2 interface. For these examples, the report component may cause the backhaul component to route the MDT report through the backhaul channel via the X2 interface to send the MDT report to the management entity.

According to some examples, where the eNB may be the first small cell eNB, the first apparatus may also include a control plane component for execution by the processor circuit to couple with a control plane channel to an MME for the EPC via an S1-MME interface. For these examples, the report component may cause the control plane component to send the MDT report though the control plane channel via the S1-MME interface.

In some examples, where the eNB may be the first small cell eNB, the first apparatus may also include a message component for execution by the processor circuit to cause a broadcast of a SIB1 message to indicate a capability of the first small cell eNB to serve as a secondary cell for the UE.

According to some examples for the first apparatus where the eNB may be the first small cell eNB, the gather component may gather information associated with the one or more small cell eNBs that includes gathering information to indicate one or more of a first time the first small cell eNB is in an activated state, a second time the first small cell eNB is in a deactivated state, a first percentage of time the first small cell eNB is in the activated state, a second percentage of time the first small cell eNB is in the deactivated state.

In some examples, the first apparatus may also include a digital display coupled to the processor circuit to present a user interface view.

In some examples, example first methods may include gathering, at an eNB capable of operating in compliance with one or more 3GPP LTE standards including LTE-A, information associated with one or more small cell eNBs capable of separately serving as a secondary cell for UE that also has a macro cell eNB serving as a primary cell. The first methods may also include sending gathered information in an MDT report to a management entity for an EPC.

According to some examples for the first methods, the eNB comprising the macro cell eNB serving as the primary cell.

In some examples for the first methods where the eNB is the macro cell eNB, the gathered information may be associated with a first small cell eNB from among the one or more small cell eNBs. For these examples, the gathered information may include a number of times a request to add the first small cell eNB as capable of serving as a secondary cell for the UE but the UE fails to establish a connection with the first small cell eNB.

According to some examples for the first methods where the eNB is the macro cell eNB, the gathered information may be associated with a first small cell eNB from among the one or more small cell eNBs. For these examples, the gathered information may include a number of times the UE reported to the macro cell eNB that the first small cell eNB was suitable to serve as a secondary cell for the UE but the UE failed to establish a connection with the first small cell eNBs responsive to a command to establish the connection.

In some examples for the first methods where the eNB is the macro cell eNB, the macro cell eNB may be coupled with the one or more small cell eNBs through separate backhaul channels via an X2 interface. The macro cell eNB may also be coupled to a mobility MME for the EPC through a control plane channel via an S1-MME interface and also coupled to a SGW for the EPC through a user plane channel via an S1-U interface.

According to some examples for the first methods where the eNB is the macro cell eNB, gathering information associated with the one or more small cell eNBs may include monitoring, at the macro cell eNB, signaling and data routed via the X2, S1-MME or S1-U interfaces. Gathering information may also include determining a traffic load on the one or more small cell eNBs based on the monitored signaling and data routed via the X2, S1-MME or S1-U interfaces and including the traffic load in the MDT report.

In some examples for the first methods where the eNB is the macro cell eNB, gathering information associated with the one or more small cell eNBs may include gathering information to indicate one or more of a first time each of the one or more small cell eNBs are in an activated state, a second time each of the one or more small cell eNBs are in a deactivated state, a first percentage of time each of the small cell eNBs are in the activated state, a second percentage of time each of the one or more small cell eNBs are in the deactivated state or a third percentage of time each of the one or more small cell eNBs served as the secondary cell for the UE.

According to some examples for the first methods, the eNB may be a first small cell eNB from among the one or more small cell eNBs.

In some examples for the first methods where the eNB is the first small cell eNB, the first methods may also include coupling with a backhaul channel to the macro cell eNB via an X2 interface routing the MDT report through the backhaul channel via the X2 interface to send the MDT report to the management entity.

According to some examples for the first methods where the eNB is the first small cell eNB, the first methods may also include coupling with a control plane channel to a mobility MME for the EPC via an S1-MME interface and sending the MDT report though the control plane channel via the S1-MME interface.

In some examples for the first methods where the eNB is the first small cell eNB, the first small cell eNB may be capable of broadcasting a SIB1 message to indicate a capability to serve as a secondary cell for the UE.

According to some examples for the first methods where the eNB is the first small cell eNB, gathering information may include gathering information to indicate one or more of a first time the first small cell eNB is in an activated state, a second time the first small cell eNB is in a deactivated state, a first percentage of time the first small cell eNB is in the activated state, a second percentage of time the first small cell eNB is in the deactivated state.

In some examples, a machine readable medium comprising a plurality of instructions that in response to being executed on a computing device may cause the computing device to carry out a computer-implemented method according to any one of the example first methods.

According some examples, an apparatus may include means for performing the computer-implemented methods of any one of the example first methods.

In some examples, a machine readable medium comprising a plurality of instructions that in response to being executed on a computing device may cause the computing device to carry out a computer-implemented method according to any one of the example first methods.

According some examples, an apparatus may include means for performing the computer-implemented methods of any one of the example first methods.

In some examples, an example first at least one machine readable medium may include a plurality of instructions that in response to being executed on a system for an eNB capable of operating in compliance with one or more 3GPP LTE standards including LTE-A may cause the system to gather information associated with one or more small cell eNBs capable of separately serving as a secondary cell for an UE that also has a macro cell eNB serving as a primary cell. The instructions may also cause the system to send gathered information in an MDT report to a management entity for an EPC.

In some examples for the first at least one machine readable medium, the eNB may be the macro cell eNB serving as the primary cell.

According to some examples for the first at least one machine readable medium where the eNB is the macro cell eNB, the gathered information may be associated with a first small cell eNB from among the one or more small cell eNBs. For these examples, the gathered information may include a number of times a request to add the first small cell eNB as capable of serving as a secondary cell for the UE but the UE fails to establish a connection with the first small cell eNB.

In some examples for the first at least one machine readable medium where the eNB is the macro cell eNB, the gathered information may be associated with a first small cell eNB from among the one or more small cell eNBs. For these examples, the gathered information may include a number of times the UE reported to the macro cell eNB that the first small cell eNB was suitable to serve as a secondary cell for the UE but the UE failed to establish a connection with the first small cell eNBs responsive to a command to establish the connection.

According to some examples for the first at least one machine readable medium where the eNB is the macro cell eNB, the macro cell eNB may be coupled with the one or more small cell eNBs through separate backhaul channels via an X2 interface and coupled to an MME for the EPC through a control plane channel via an S1-MME interface and also coupled to a SGW for the EPC through a user plane channel via an S1-U interface.

In some examples for the first at least one machine readable medium where the eNB is the macro cell eNB, the instructions to cause the system to gather information associated with the one or more small cell eNBs may also include the instructions to cause the system to monitor signaling and data routed via the X2, S1-MME or S1-U interfaces. The instructions may cause the system to determine a traffic load on the one or more small cell eNBs based on the monitored signaling and data routed via the X2, S1-MME or S1-U interfaces and include the determined traffic load in the MDT report sent to the MME.

According to some examples for the first at least one machine readable medium where the eNB is the macro cell eNB, the instructions to gather information associated with the one or more small cell eNBs may include instructions to gather information to indicate one or more of a first time each of the one or more small cell eNBs are in an activated state, a second time each of the one or more small cell eNBs are in a deactivated state, a first percentage of time each of the small cell eNBs are in the activated state, a second percentage of time each of the one or more small cell eNBs are in the deactivated state or a third percentage of time each of the one or more small cell eNBs served as the secondary cell for the UE.

In some examples for the first at least one machine readable medium, the eNB may be a first small cell eNB from among the one or more small cell eNBs.

According to some examples for the first at least one machine readable medium where the enB is the small cell eNB, the instructions may further cause the system to couple with a backhaul channel to the macro cell eNB via an X2 interface and route the MDT report through the backhaul channel via the X2 interface to send the MDT report to the management entity.

In some examples for the first at least one machine readable medium where the enB is the small cell eNB, the instructions may further cause the system to couple with a control plane channel to a MME for the EPC via an S1-MME interface and send the MDT report though the control plane channel via the S1-MME interface.

According some examples for the first at least one machine readable medium where the enB is the small cell eNB, the instruction may also cause the system to broadcast a SIB1 message to indicate a capability of the first small cell eNB to serve as a secondary cell for the UE.

In some examples for the first at least one machine readable medium where the enB is the small cell eNB, the gathered information may indicate one or more of a first time the first small cell eNB is in an activated state, a second time the first small cell eNB is in a deactivated state, a first percentage of time the first small cell eNB is in the activated state, a second percentage of time the first small cell eNB is in the deactivated state.

In some examples, an example second apparatus may include a processor circuit for an UE capable of operating in compliance with one or more 3GPP LTE standards including LTE-A. The second apparatus also including a detect component for execution by the processor circuit to detect a small cell eNB. The second apparatus also including a qualification component for execution by the processor circuit to determine whether the small cell eNB is suitable for serving as a secondary cell with a macro cell eNB serving as a primary cell for the UE and report to the macro cell eNB that the small cell eNB is suitable based on the determination. The second apparatus also including a command component for execution by the processor circuit to receive a command from the macro cell eNB to add the small cell eNB as the secondary cell, adding to include the command component to cause the UE to maintain a first connection with the macro cell eNB and maintain a second connection with the small cell eNB. The second apparatus also including a gather component for execution by the processor circuit to gather measurements associated with detecting the small cell eNB, adding the small cell eNB as the secondary cell or maintaining the second connection. The second apparatus also including a report component for execution by the processor circuit to send gathered measurements in an MDT report to a management entity for an EPC.

According to some examples for the second apparatus, the qualification component may determine the small cell eNB is suitable based at least in part on a SIB1 message received from the small cell eNB that includes an indication that the small cell eNB is qualified to serve as the secondary cell.

In some examples, the second apparatus may also include a signal component for execution by the processor circuit to measure a radio reference signal received power (RSRP), a reference signal received quality (RSRQ) or a received signal strength indicator (RSSI) from the small cell eNB. The qualification component may determine the small cell eNB is suitable based at least in part on whether the RSRP, RSRQ or RSSI from the small cell eNB as measured by the signal component exceeds a given threshold.

According to some examples for the second apparatus, the gather component may gather measurements associated with detecting the small cell eNB comprises the gather component to gather one or more of a signal strength detected by the signal component from the small cell eNB, a small cell identifier for the small cell eNB, a channel quality indication received by the signal component for use in establishing a connection with the small cell eNB or an amount of time the small cell was determined as suitable by the qualification component.

In some examples for the second apparatus, the gather component to gather measurements associated with adding the small cell eNB may include the gather component to gather information for a delay in time from when the small cell eNB was determined as suitable by the qualification component and reported to the macro eNB to the time the command component receives the command to add the small cell eNB as the secondary cell.

According to some examples for the second apparatus, the gather component to gather measurements associated with the command component causing the UE to maintain the second connection with the small cell eNB may include the gather component to gather measurements that indicate an amount of time the UE maintains the second connection with the small cell eNB.

In some examples for the second apparatus, the gather component may aggregate the amount of time the UE maintain the second connection with the small cell eNB with other amounts of times the UE maintained other second connections with other small cell eNBs.

According to some examples for the second apparatus, the gather component may maintain the gathered measurements in an MDT log stored at the UE.

In some examples for the second apparatus, the report component may send the gathered measurements maintained in the MDT log responsive to a report command received by the report component from the management entity, elapse of an MDT report time interval, or a capacity of a memory used to store the MDT log at the UE has been reached.

In some examples, the second apparatus may also include a digital display coupled to the processor circuit to present a user interface view.

In some examples, example second methods may include detecting, at an UE capable of operating in compliance with one or more 3GPP LTE standards including LTE-A, small cell eNB. The second methods may also include determining whether the small cell eNB is suitable for serving as a secondary cell with a macro cell eNB serving as a primary cell for the UE. The second methods may also include reporting to the macro cell eNB that the small cell eNB is suitable based on the determination. The second methods may also include receiving a command from the macro cell eNB to add the small cell eNB as the secondary cell, adding to include maintaining a first connection with the macro cell eNB and maintaining a second connection with the small cell eNB. The second methods may also include gathering measurements associated with detecting the small cell eNB, adding the small cell eNB as the secondary cell or maintaining the second connection. The second methods may also include sending gathered measurements in an MDT report to a management entity for an EPC.

In some examples for the second methods, determining the small cell eNB is suitable may be based at least in part on a SIB1 message received from the small cell eNB that includes an indication that the small cell eNB is qualified to serve as the secondary cell.

According to some examples for the second methods, determining the small cell eNB is suitable may be based at least in part on whether a radio receive signal power (RRSP) from the small cell eNB as measured by the UE exceeds a given threshold.

In some examples for the second methods, gathering measurements associated with detecting the small cell eNB may include gathering one or more of a signal strength detected from the small cell eNB, a small cell identifier for the small cell eNB, a channel quality indication for establishing a connection with the small cell eNB or an amount of time the small cell was determined as suitable.

According to some examples for the second methods, gathering measurements associated with adding the small cell eNB may include gathering information for a delay in time from when the small cell eNB was determined as suitable and reported to the macro eNB to the time the UE receives the command to add the small cell eNB as the secondary cell.

In some examples for the second methods, gathering measurements associated with adding the small cell eNB may include measuring a number of times the UE received a command to add the small cell eNB or other detected small cell eNBs and the second connection to the small cell eNB or the other detected small cell eNBs was unsuccessful.

According some examples for the second methods, gathering measurements for each unsuccessful connection may include gathering one or more of a signal strength for the detected small cell eNB, a small cell identifier for the detected small cell eNB, a location of the UE when the connection was unsuccessful.

In some examples for the second methods, gathering measurements associated with maintaining the second connection with the small cell eNB may include gathering measurements that indicate an amount of time the UE maintains the second connection with the small cell eNB.

According to some examples, the second methods may also include aggregating the amount of time the UE maintain the second connection with the small cell eNB with other amounts of times the UE maintained other second connections with other small cell eNBs.

In some examples, the second methods may include maintaining the gathered measurements in an MDT log stored at the UE.

According to some examples, the second methods may include sending the gathered measurements maintained in the MDT log responsive to a report command received from the management entity, elapse of an MDT report time interval, or an allocated capacity of a memory used to store the MDT log at the UE has been reached.

In some examples, a machine readable medium comprising a plurality of instructions that in response to being executed on a computing device may cause the computing device to carry out a computer-implemented method according to any one of the example second methods.

According some examples, an apparatus may include means for performing the computer-implemented methods of any one of the example second methods.

In some examples, a machine readable medium comprising a plurality of instructions that in response to being executed on a computing device may cause the computing device to carry out a computer-implemented method according to any one of the example second methods.

According some examples, an apparatus may include means for performing the computer-implemented methods of any one of the example second methods.

In some examples, an example second at least one machine readable medium may include a plurality of instructions that in response to being executed on a system for an UE capable of operating in compliance with one or more 3GPP LTE standards including LTE-A may cause the system to detect a small cell evolved Node B (eNB). The instructions may also cause the system to determine whether the small cell eNB is suitable for serving as a secondary cell with a macro cell eNB serving as a primary cell for the UE. The instructions may also cause the system to report to the macro cell eNB that the small cell eNB is suitable based on the determination. The instructions may also cause the system to receive a command from the macro cell eNB to add the small cell eNB as the secondary cell, adding to include maintaining a first connection with the macro cell eNB and maintaining a second connection with the small cell eNB. The instructions may also cause the system to gather measurements associated with detecting the small cell eNB, adding the small cell eNB as the secondary cell or maintaining the second connection. The instructions may also cause the system to send gathered measurements in an MDT report to a management entity for an EPC.

In some examples for the second at least one machine readable medium, the small cell eNB may be determined as suitable based at least in part on a SIB1 message received from the small cell eNB that includes an indication that the small cell eNB is suitable to serve as the secondary cell.

According to some examples for the second at least one machine readable medium, the small cell eNB may be determined as suitable based at least in part on whether a radio reference signal received power (RSRP), a reference signal received quality (RSRQ) or a received signal strength indicator (RSSI) from the small cell eNB as measured by the UE exceeds a given threshold.

In some examples for the second at least one machine readable medium, the instructions to cause the system to gather measurements associated with detecting the small cell eNB may cause the system to gather one or more of a signal strength detected from the small cell eNB, a small cell identifier for the small cell eNB, a channel quality indication for establishing a connection with the small cell eNB or an amount of time the small cell was determined as suitable.

According to some examples for the second at least one machine readable medium, the instructions to cause the system to gather measurements associated with adding the small cell eNB may cause the system to gather information for a delay in time from when the small cell eNB was determined as suitable and reported to the macro eNB to the time the UE receives the command to add the small cell eNB as the secondary cell.

In some examples for the second at least one machine readable medium, the instructions to cause the system to gather measurements associated with adding the small cell eNB may cause the system to measure a number of times the UE received a command to add the small cell eNB or other detected small cell eNBs and the second connection to the small cell eNB or the other detected small cell eNBs was unsuccessful.

According to some examples for the second at least one machine readable medium, to gather measurements for each unsuccessful connection may include gathering one or more of a signal strength for the detected small cell eNB, a small cell identifier for the detected small cell eNB, a location of the UE when the connection was unsuccessful.

In some examples for the second at least one machine readable medium, the instructions to cause the system to gather measurements associated with maintaining the second connection with the small cell eNB may cause the system to gather measurements that indicate an amount of time the UE maintains the second connection with the small cell eNB.

According to some examples for the second at least one machine readable medium, the instructions may also cause the system to aggregate the amount of time the UE maintains the second connection with the small cell eNB with other amounts of times the UE maintained other second connections with other small cell eNBs.

In some examples for the second at least one machine readable medium, the instructions may cause the system to maintain the gathered measurements in an MDT log stored at the UE.

According to some examples for the second at least one machine readable medium, the instructions may cause the system to send the gathered measurements maintained in the MDT log responsive to a report command received from the management entity, elapse of an MDT report time interval, or a capacity of a memory used to store the MDT log at the UE has been reached.

In some examples, an example third apparatus may include a processor circuit for a management entity for an EPC, the management entity capable of operating in compliance with one or more 3GPP LTE standards including LTE-Advanced (LTE-A). The third apparatus also including a receive component for execution by the processor circuit to receive an MDT report originating from an UE, a macro cell eNB or a small cell eNB. The third apparatus also including a management component for execution by the processor circuit to manage one or more small cell eNBs based on the MDT report. The one or more small cell eNBs may be separately capable of serving as a secondary cell for the UE while the macro cell eNB serves as a primary cell for the UE. Manage may include causing at least some of the one or more small cell eNBs to be activated to serve as potential secondary cells for the UE or to be deactivated from serving as potential secondary cells for the UE.

According to some examples for the third apparatus, the management component to manage the small cell eNBs based on the MDT report to also include the management component to cause one or more small cell eNBs to be added to the macro cell provided by the macro cell eNB or cause one or more small cell eNBs to be removed from the macro cell.

In some examples for the third apparatus, the MDT report may originate from the macro cell eNB and may include traffic load information for the small cell eNBs. The traffic load information may indicate that at least a first portion of the small cell eNBs have a peak traffic load during a first range of hours and low traffic load during a second range of hours. The management component may cause the first portion of the small cell eNBs to be activated during the first range and to be deactivated during the second range.

According to some examples for the third apparatus, the MDT report may originate from the macro cell eNB or a first small cell eNB from among the small cell eNBs. The MDT report may indicate one or more of a time the first small cell eNB is activated, a time the first small cell eNB is deactivated, a first percentage of time the first small cell eNB is activated, a second percentage of time the first small cell eNB is deactivated or a third percentage of time the first small cell eNB is serving as the secondary cell for the UE.

In some examples, the third apparatus may also include a digital display coupled to the processor circuit to present a user interface view.

In some examples, example third methods may include receiving, at a management entity for an EPC, the management entity capable of operating in compliance with one or more 3GPP LTE standards including LTE-A, an MDT report originating from an UE, a macro cell eNB a small cell eNB. The third methods may also include managing small cell eNBs based on the MDT report. The small cell eNBs may be separately capable of serving as a secondary cell for the UE while the macro cell eNB serves as a primary cell for the UE. Managing may include causing a first portion of the small cell eNBs to be activated to serve as potential secondary cells for the UE or deactivated from serving as potential secondary cells for the UE.

According to some examples for the third methods, managing the small cell eNBs based on the MDT report may also include adding one or more small cell eNBs to the macro cell provided by the macro cell eNB or removing one or more small cell eNBs from the macro cell.

In some examples for the third methods, the MDT report may originate from the macro cell eNB and may include traffic load information for the small cell eNBs. The traffic load information may indicate that at least a first portion of the small cell eNBs have a peak traffic load during a first range of hours and low traffic load during a second range of hours. The management entity may cause the first portion of the small cell eNBs to be activated during the first range of hours and to be deactivated during the second range of hours.

According to some examples for the third methods, the MDT report may originate from the macro cell eNB or a first small cell eNB from among the small cell eNBs. The MDT report may indicate one or more of a time the first small cell eNB is activated, a time the first small cell eNB is deactivated, a first percentage of time the first small cell eNB is activated, a second percentage of time the first small cell eNB is deactivated or a third percentage of time the first small cell eNB is serving as the secondary cell for the UE.

In some examples for the third methods, the MDT report may originate from the macro cell eNB. The MDT report may include information associated with a first small cell eNB from among the small cell eNBs. The information may include a number of times the UE reported to the macro cell eNB that the first small cell eNB was suited to serve as a secondary cell for the UE but the UE failed to establish a connection with the first small cell eNBs responsive to a command to establish the connection.

According to some examples for the third methods, the MDT report may originate from the macro cell eNB. The MDT report may include information associated with a first small cell eNB from among the small cell eNBs. The information may include a number of times a request to add the first small cell eNB as capable of serving as a secondary cell for the UE but the UE fails to establish a connection with the first small cell eNB.

In some examples for the third methods, the MDT report may originate from the UE. The MDT report may include information associated with a first small cell eNB from among the small cell eNBs. The information may include a first amount of time the first small cell eNB is suitable for serving as the secondary cell for the UE, a second amount of time the UE stays connected to the first small cell eNB while serving as the secondary cell, a delay time between the UE identifying the first small cell eNB as suitable for serving as the secondary cell and receiving a command from the macro cell eNB to establish a connection with the first small cell eNB or a number of times the UE received a command from the macro cell eNB to establish the connection.

In some examples, a machine readable medium comprising a plurality of instructions that in response to being executed on a computing device may cause the computing device to carry out a computer-implemented method according to any one of the example third methods.

According some examples, an apparatus may include means for performing the computer-implemented methods of any one of the example third methods.

In some examples, a machine readable medium comprising a plurality of instructions that in response to being executed on a computing device may cause the computing device to carry out a computer-implemented method according to any one of the example third methods.

According some examples, an apparatus may include means for performing the computer-implemented methods of any one of the example third methods.

In some examples, an example third at least one machine readable medium may include a plurality of instructions that in response to being executed on a system for a management entity for an EPC, the management entity capable of operating in compliance with one or more 3GPP LTE standards including LTE-A may cause the system to Advanced (LTE-A) causes the system to receive an MDT report originating from UE, a macro cell eNB, or a small cell eNB. The instructions may also cause the system to manage one or more small cell eNBs based on the MDT report. The one or more small cell eNBs may be separately capable of serving as a secondary cell for the UE while the macro cell eNB serves as a primary cell for the UE. Manage may include causing at least some of the one or more small cell eNBs to be activated to serve as potential secondary cells for the UE or to be deactivated from serving as potential secondary cells for the UE.

In some examples for the third at least one machine readable medium, the instruction to cause the system to manage the small cell eNBs based on the MDT report may also include causing one or more small cell eNBs to be added to the macro cell provided by the macro cell eNB or causing one or more small cell eNBs to be removed from the macro cell.

According to some examples for the third at least one machine readable medium, the MDT report may originate from the macro cell eNB and may include traffic load information for the small cell eNBs. The traffic load information may indicate that at least a first portion of the small cell eNBs have a peak traffic load during a first range of hours and low traffic load during a second range of hours. The management entity may cause the first portion of the small cell eNBs to be activated during the first range and to be deactivated during the second range.

In some examples for the third at least one machine readable medium, the MDT report may originate from the macro cell eNB. The MDT report may include information associated with a first small cell eNB from among the small cell eNBs. The information may include a number of times the UE reported to the macro cell eNB that the first small cell eNB was suited to serve as a secondary cell for the UE but the UE failed to establish a connection with the first small cell eNBs responsive to a command to establish the connection.

According to some examples for the third at least one machine readable medium, the MDT report may originate from the macro cell eNB. The MDT report may include information associated with a first small cell eNB from among the small cell eNBs. The information may include a number of times a request to add the first small cell eNB as capable of serving as a secondary cell for the UE but the UE fails to establish a connection with the first small cell eNB.

In some examples for the third at least one machine readable medium, the MDT report may originate from the UE. The MDT report may include information associated with a first small cell eNB from among the small cell eNBs. The information may include a first amount of time the first small cell eNB is suitable for serving as the secondary cell for the UE, a second amount of time the UE stays connected to the first small cell eNB while serving as the secondary cell, a delay time between the UE identifying the first small cell eNB as suitable for serving as the secondary cell and receiving a command from the macro cell eNB to establish a connection with the first small cell eNB or a number of times the UE received a command from the macro cell eNB to establish the connection.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. At least one non-transitory machine-readable medium comprising a plurality of instructions that, in response to being executed by processing circuitry of a macro cell evolved node B (eNB), cause the macro cell eNB to:
gather information associated with one or more small cell eNBs, each of the one or more small cell eNBs to comprise a candidate for serving as a secondary cell for user equipment (UE) that also has the macro cell eNB serving as a primary cell, the gathered information associated with a first small cell eNB from among the one or more small cell eNBs, the gathered information to include a number of times a request to add the first small cell eNB as a candidate for serving as a secondary cell for the UE but the UE fails to establish a connection with the first small cell eNB; and
send the gathered information in a minimization of drive tests (MDT) report to a management entity for an evolved packet core (EPC).

2. At least one non-transitory machine-readable medium comprising a plurality of instructions that, in response to being executed by processing circuitry of a macro cell evolved node B (eNB), cause the macro cell eNB to:
gather information associated with one or more small cell eNBs, each of the one or more small cell eNBs to comprise a candidate for serving as a secondary cell for user equipment (UE) that also has the macro cell eNB serving as a primary cell, the gathered information associated with a first small cell eNB from among the one or more small cell eNBs, the gathered information to include a number of times the UE reported to the macro cell eNB that the first small cell eNB was suitable to serve as a secondary cell for the UE but the UE failed to establish a connection with the first small cell eNBs responsive to a command to establish the connection; and
send the gathered information in a minimization of drive tests (MDT) report to a management entity for an evolved packet core (EPC).

3. The at least one non-transitory machine-readable medium of claim 1, the macro cell eNB coupled with the one or more small cell eNBs through separate backhaul channels via an X2 interface and coupled to a mobility management entity (MME) for the EPC through a control plane channel via an S1-MME interface and also coupled to a serving gateway (SGW) for the EPC through a user plane channel via an S1-U interface.

4. The at least one non-transitory machine-readable medium of claim 3, comprising instructions that, in response to being executed by the processing circuitry of the eNB, cause the eNB to:
monitor signaling and data routed via the X2, S1-MME or S1-U interfaces;
determine a traffic load on the one or more small cell eNBs based on the monitored signaling and data routed via the X2, S1-MME or S1-U interfaces; and
include the determined traffic load in the MDT report sent to the MME.

5. At least one non-transitory machine-readable medium comprising a plurality of instructions that, in response to being executed by processing circuitry of a macro cell evolved node B (eNB), cause the macro cell eNB to:
gather information associated with one or more small cell eNBs, each of the one or more small cell eNBs to comprise a candidate for serving as a secondary cell for user equipment (UE) that also has the macro cell eNB serving as a primary cell, the gathered information to indicate one or more of a first time each of the one or more small cell eNBs are in an activated state, a second time each of the one or more small cell eNBs are in a deactivated state, a first percentage of time each of the small cell eNBs are in the activated state, a second percentage of time each of the one or more small cell eNBs are in the deactivated state or a third percentage of time each of the one or more small cell eNBs served as the secondary cell for the UE; and
send gathered information in a minimization of drive tests (MDT) report to a management entity for an evolved packet core (EPC).

6. At least one non-transitory machine-readable medium comprising a plurality of instructions that, in response to being executed by processing circuitry of a small cell evolved node B (eNB), cause the small cell eNB to:
gather information associated with the small cell eNB to comprise a candidate for serving as a secondary cell for user equipment (UE) that also has a macro cell eNB serving as a primary cell, the gathered information to indicate one or more of a first time the small cell eNB is in an activated state, a second time the small cell eNB is in a deactivated state, a first percentage of time the small cell eNB is in the activated state, a second percentage of time the small cell eNB is in the deactivated state; and
send the gathered information in a minimization of drive tests (MDT) report to a management entity for an evolved packet core (EPC).

7. The at least one non-transitory machine-readable medium of claim 6, comprising instructions that, in response to being executed by the processing circuitry of the eNB, cause the eNB to:
couple with a backhaul channel to the macro cell eNB via an X2 interface; and
route the MDT report through the backhaul channel via the X2 interface to send the MDT report to the management entity.

8. The at least one non-transitory machine-readable medium of claim 6, comprising instructions that, in response to being executed by the processing circuitry of the eNB, cause the eNB to:
couple with a control plane channel to a mobility management entity (MME) for the EPC via an S1-MME interface; and
send the MDT report though the control plane channel via the S1-MME interface.

9. An apparatus comprising:
at least one memory; and
logic for user equipment (UE), at least a portion of the logic implemented in circuitry coupled to the at least one memory, the logic to:
detect a small cell evolved Node B (eNB);
determine whether the small cell eNB is suitable for serving as a secondary cell with a macro cell eNB serving as a primary cell for the UE and report to the macro cell eNB that the small cell eNB is suitable based on the determination;
receive a command from the macro cell eNB to add the small cell eNB as the secondary cell, the adding to cause the UE to maintain a first connection with the macro cell eNB and maintain a second connection with the small cell eNB;
gather measurements associated with detecting the small cell eNB, adding the small cell eNB as the secondary cell or maintaining the second connection, the gathered measurements to include measurements that indicate an amount of time that the UE maintains the second connection with the small cell eNB; and
send gathered measurements in a minimization of drive tests (MDT) report to a management entity for an evolved packet core (EPC).

10. The apparatus of claim 9, the logic to determine the small cell eNB is suitable based at least in part on a SystemInformationBlockType1 (SIB1) message received from the small cell eNB that includes an indication that the small cell eNB is qualified to serve as the secondary cell.

11. The apparatus of claim 9, the logic to:
measure a radio reference signal received power (RSRP), a reference signal received quality (RSRQ) or a received signal strength indicator (RSSI) from the small cell eNB; and
determine the small cell eNB is suitable based at least in part on whether the RSRP, RSRQ or RSSI from the small cell eNB exceeds a given threshold.

12. The apparatus of claim 11, the logic to gather one or more of a detected signal strength from the small cell eNB, a small cell identifier for the small cell eNB, a received channel quality indication for use in establishing a connection with the small cell eNB or an amount of time the small cell was determined as suitable.

13. The apparatus of claim 9, the logic to gather information for a delay in time from when the small cell eNB was determined as suitable and reported to the macro eNB to the time the command to add the small cell eNB as the secondary cell is received.

14. The apparatus of claim 9, the logic to aggregate the amount of time the UE maintain the second connection with the small cell eNB with other amounts of times the UE maintained other second connections with other small cell eNBs.

15. The apparatus of claim 9, the logic to maintain the gathered measurements in an MDT log stored at the UE.

16. The apparatus of claim 15, the logic to send the gathered measurements maintained in the MDT log responsive to a report command received from the management entity, elapse of an MDT report time interval, or a capacity of a memory used to store the MDT log at the UE has been reached.

17. The apparatus of claim 9, comprising a digital display coupled to the circuitry to present a user interface view.

18. A computer-implemented method comprising:
receiving, at a management entity for an evolved packet core (EPC), a minimization of drive tests (MDT) report originating from a macro cell evolved Node B (eNB); and
managing small cell eNBs based on the MDT report, each of the small cell eNBs to comprise a candidate for serving as a secondary cell for the UE while the macro cell eNB serves as a primary cell for the UE, managing to include causing a first portion of the small cell eNBs to be activated to serve as potential secondary cells for the UE or deactivated from serving as potential secondary cells for the UE;
wherein the MDT report includes traffic load information for the small cell eNBs, the traffic load information to indicate that at least a first portion of the small cell eNBs have a peak traffic load during a first range of hours and low traffic load during a second range of hours, the management entity to cause the first portion of the small cell eNBs to be activated during the first range of hours and to be deactivated during the second range of hours.

19. The computer-implemented method of claim 18, managing the small cell eNBs based on the MDT report to also include adding one or more small cell eNBs to the macro cell provided by the macro cell eNB or removing one or more small cell eNBs from the macro cell.

* * * * *